US012031661B2

(12) United States Patent
Parrella et al.

(10) Patent No.: US 12,031,661 B2
(45) Date of Patent: Jul. 9, 2024

(54) PIPE RECONDITIONING SYSTEM

(71) Applicant: Exotex, Inc., Houston, TX (US)

(72) Inventors: Michael J. Parrella, Katy, TX (US); Nevil R. Ede, Westport, CT (US)

(73) Assignee: EXOTEX, INC., Houston, TX (US)

( * ) Notice: Subject to any disclaimer, the term of this patent is extended or adjusted under 35 U.S.C. 154(b) by 463 days.

(21) Appl. No.: 17/488,856

(22) Filed: Sep. 29, 2021

(65) Prior Publication Data
US 2023/0102801 A1 Mar. 30, 2023

(51) Int. Cl.
F16L 55/1645 (2006.01)
F16L 55/30 (2006.01)
G05B 19/416 (2006.01)
F16L 101/16 (2006.01)
G06Q 10/20 (2023.01)

(52) U.S. Cl.
CPC ......... F16L 55/16455 (2013.01); F16L 55/30 (2013.01); G05B 19/416 (2013.01); F16L 2101/16 (2013.01); G05B 2219/37371 (2013.01); G06Q 10/20 (2013.01)

(58) Field of Classification Search
CPC ............... F16L 55/164; F16L 55/1645; F16L 55/16455; F16L 58/02; F16L 2101/16; F16L 55/30
USPC ...... 138/98, 97; 118/317, 234; 427/236, 230
See application file for complete search history.

(56) References Cited

U.S. PATENT DOCUMENTS

| 3,103,235 | A | * | 9/1963 | Stringham, III | .. F16L 55/16455 138/93 |
| 4,178,875 | A | * | 12/1979 | Moschetti | ............... B05B 13/06 118/712 |
| 4,556,580 | A | * | 12/1985 | Kamuro | ............... G01M 3/2853 427/140 |
| 4,584,963 | A | * | 4/1986 | Morinaga | ........... F16L 55/1645 118/215 |
| 4,691,728 | A | * | 9/1987 | Mathison | .......... F16L 55/16455 137/355.27 |
| 5,246,641 | A | * | 9/1993 | Perkins | ............... F16L 55/1645 264/269 |
| 5,409,561 | A | * | 4/1995 | Wood | ...................... F16L 58/02 264/269 |
| 5,609,186 | A | * | 3/1997 | Satake | .................. F16L 55/164 264/269 |
| 7,641,756 | B2 | * | 1/2010 | Schwert | ............... F16L 55/1651 405/184.2 |
| 9,724,872 | B2 | * | 8/2017 | Kiest, Jr. | ............. F16L 55/1645 |

* cited by examiner

Primary Examiner — Patrick F Brinson
(74) Attorney, Agent, or Firm — Ware, Fressola, Maguire & Barber LLP

(57) ABSTRACT

A pipeline reconditioning system and process is provided for reconditioning corroded or damaged pipelines. The reconditioning system includes a mobile topside unit storing and providing reservoirs and supplies of substances used in the pipeline reconditioning and the equipment for the reconditioning system, a management and towing units that are securely anchored in the pipeline at remote access points, and a towed delivery system array that includes a deployment sled that processes the substances and dispenses the reconditioning material, such as a composite epoxy resin with chopped glass or basalt filament fibers, between access points to the pipeline interior.

20 Claims, 26 Drawing Sheets

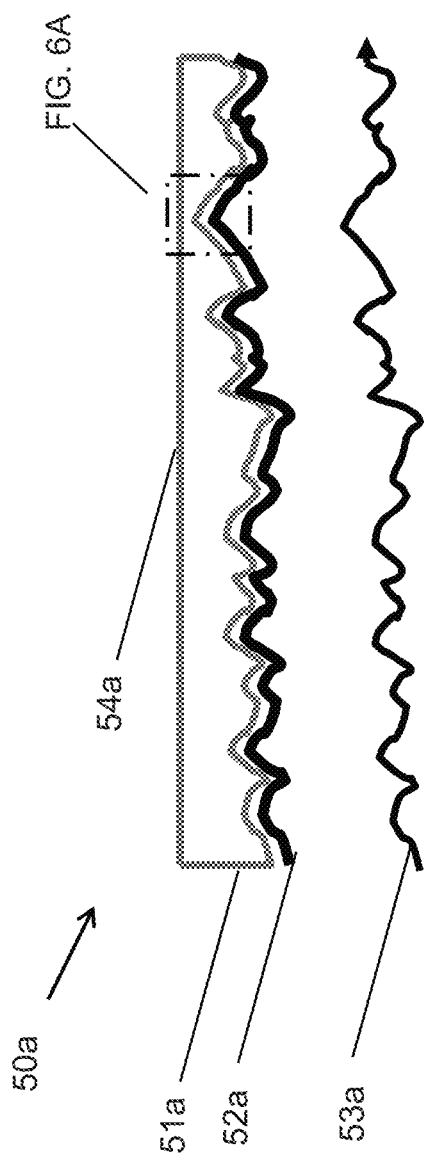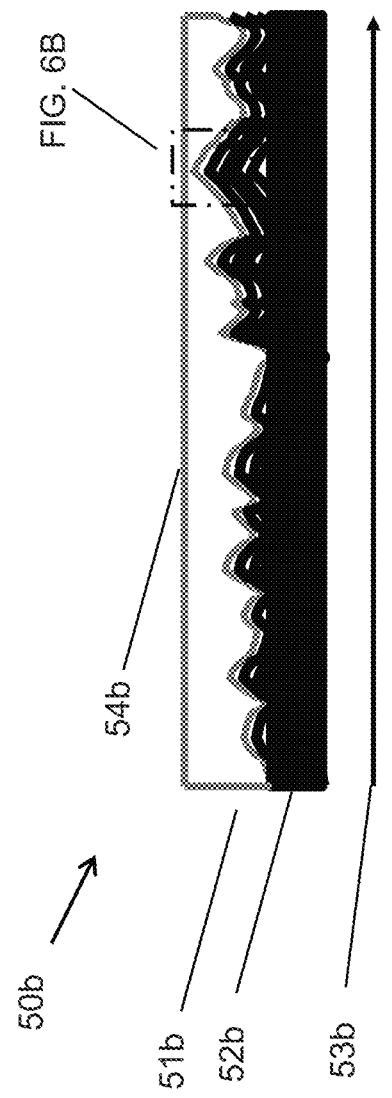
FIG. 5A
Prior Art
FIG. 5B

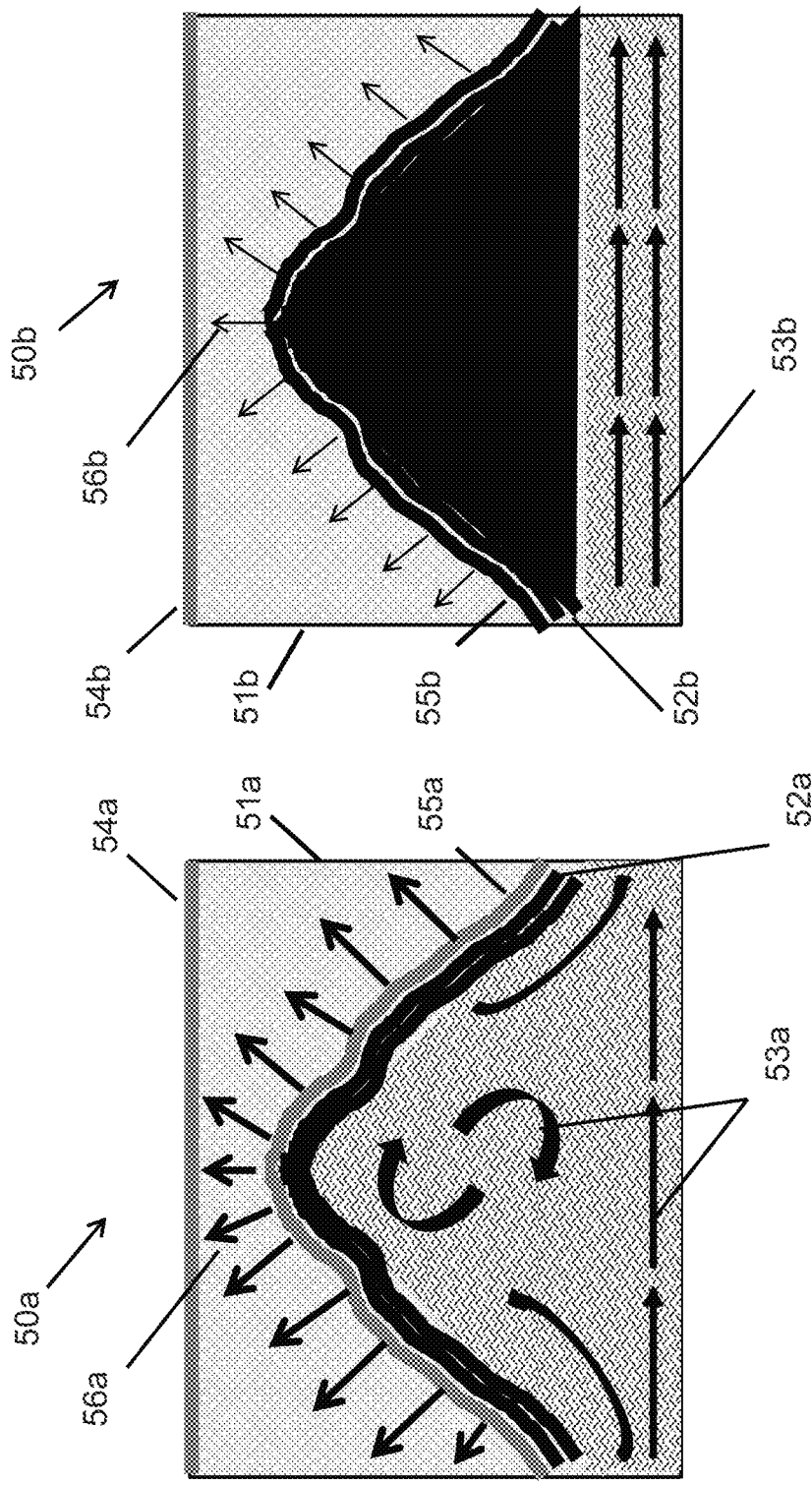

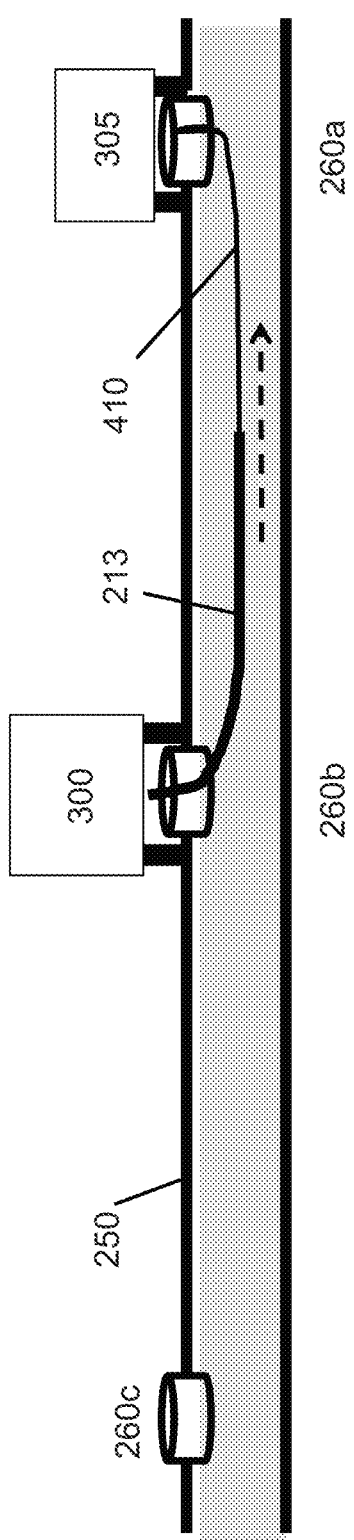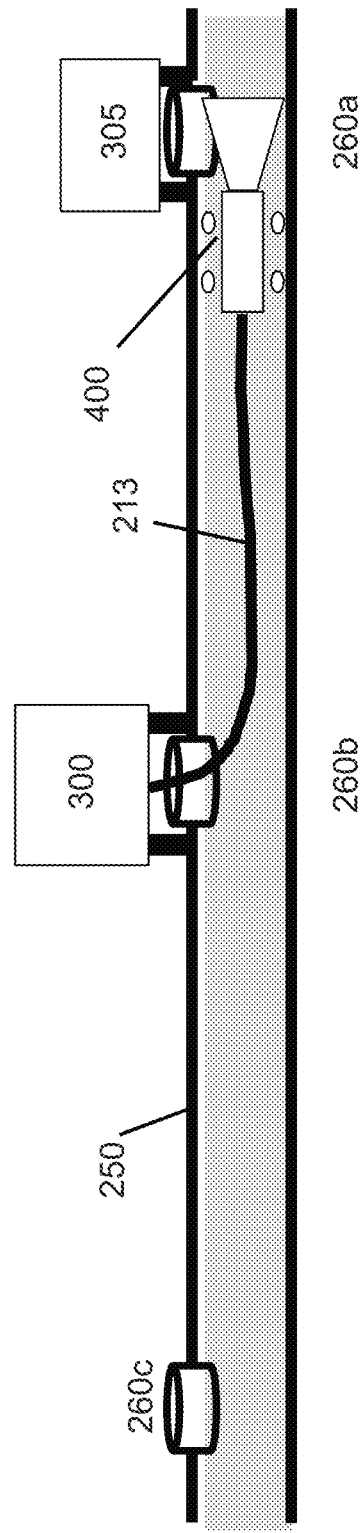

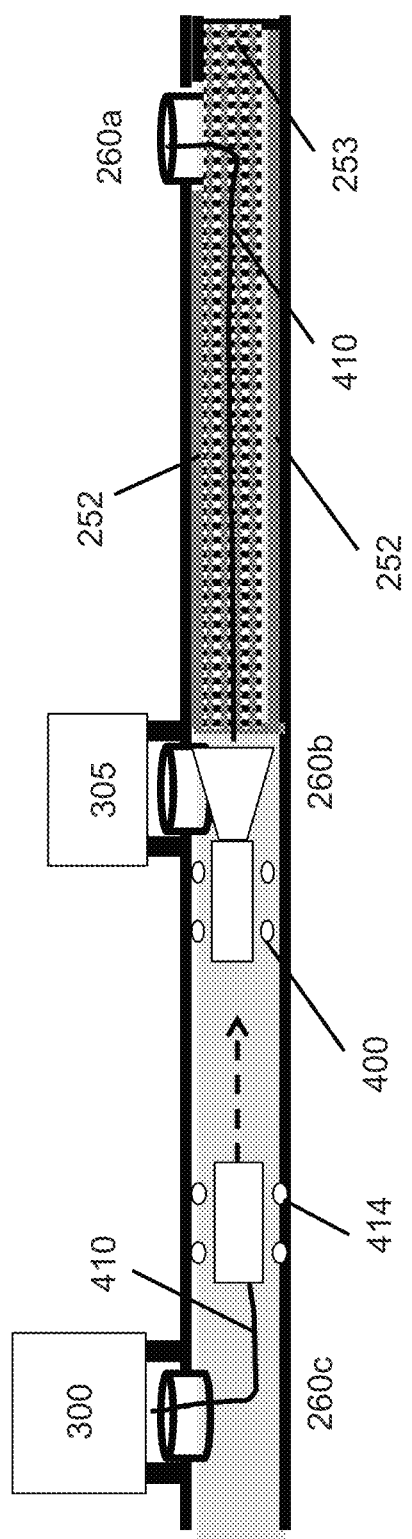
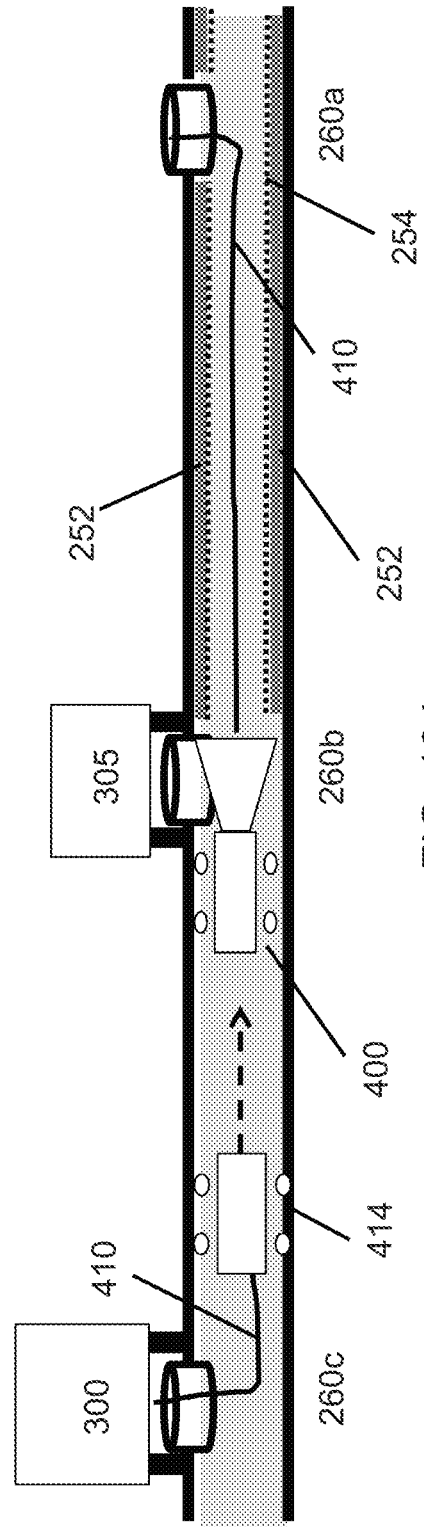

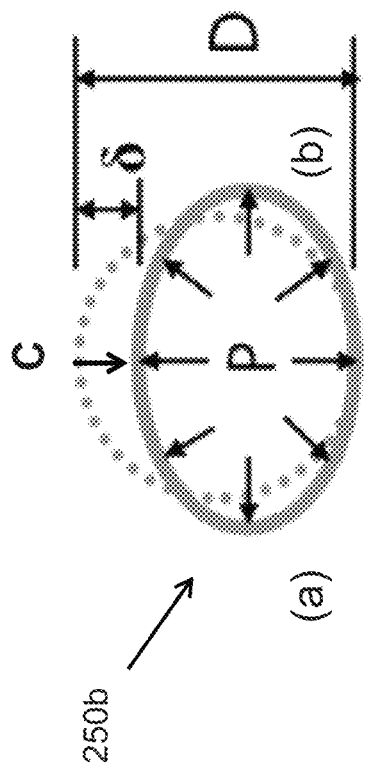
FIG. 16
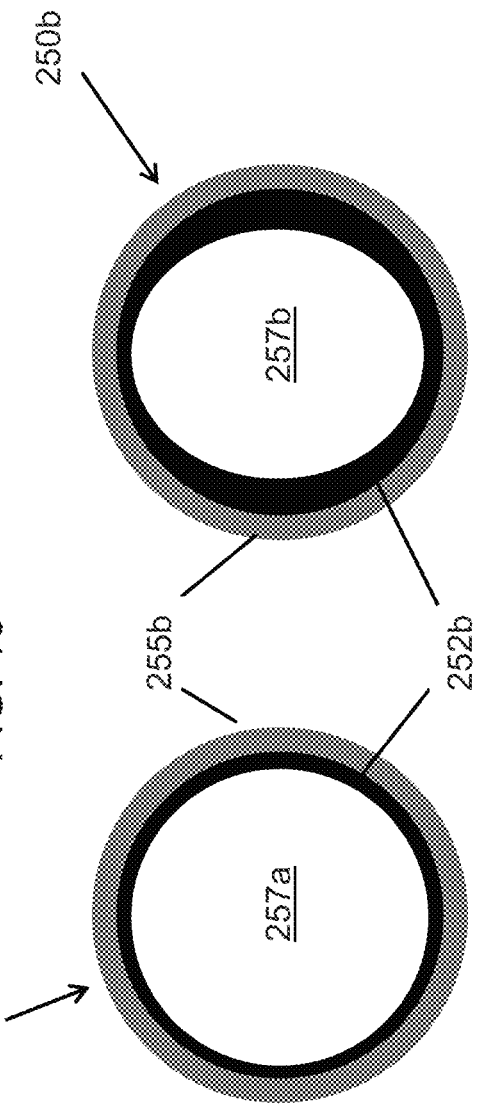
FIG. 17
FIG. 18

PIPE RECONDITIONING SYSTEM

BACKGROUND OF THE DISCLOSURE

The development of high strength steel pipe technology has allowed for greater transmission of oil and gas due to the ability to increase internal pressure while decreasing the wall thickness of the pipe. API 5L X80 steel has excellent mechanical properties such as high strength, good toughness and good fatigue resistance.

However, when used for the transportation of oil and gas products (as well as other fluids such as water, sea water, chemicals, etc.), the integrity and operational efficiency of pipelines is subject to degradation due to corrosion. Historically, up to 63% of pipeline failures can be attributed to corrosion. Various pipe rupture statistics are shown below in Table 1.

TABLE 1

Pipe Rupture Comparison

|  | NEB (1991-2008) (%) | ERCB (2000-2007) (%) | PHMSA (1987-2008) (%) | EGIG (1970-2007) (%) |
| --- | --- | --- | --- | --- |
| Corrosion | 63% | 7% | 22% | 15% |
| External Interference | 6% | 49% | 24% | 50% |
| Material (Manufacturing or Construction) | 6% | 28% | 20% | 17% |
| Geotechnical | 6% | 2% | 5% | 7% |
| Other Causes | 19% | 15% | 29% | 11% |

Aged pipes can have several issues. Examples of causes of corrosion of a pipe 20 are illustrated in FIG. 1, including internal corrosion 21 (pitting or uniform corrosion), external corrosion 22 (MIC, oxidation, under deposition), hydrogen induced cracking 23, flow induced corrosion 24 and cracking 25 (stress corrosion cracking, embrittlement, sulfide corrosion cracking). While pipe manufacturers and operators seek to minimize corrosion damage to pipe through the use of powder coatings and fusion bond epoxy (FBE) applied prior to shipment, for example, these coatings and treatments can be damaged or degraded due to storage, handling and installation, as well as general operational wear and tear. This damage or degradation leads to the exposure of raw steel surfaces (both internal and external), which are then subjected to corrosive elements.

During the process of secondary oil recovery, which is becoming increasingly common, a large amount of produced water is generated which contains dissolved salts, inorganic and organic constituents, solids, oil, dissolved gases ($CO_2$ and $H_2S$) and microorganisms. The dissolved gasses lead to the formation of corrosive acids and the microorganisms lead to biological damage.

Three types of corrosion can occur in oil and gas pipeline systems when carbon dioxide ($CO_2$) and hydrogen sulfide ($H_2S$) are present in the hydrocarbon fluid: sweet corrosion, sour corrosion and biological corrosion. Sweet corrosion occurs in systems containing only $CO_2$ or a trace of $H_2S$ (e.g., partial pressure <0.05 psi). Sour corrosion occurs in systems containing $H_2S$ above a partial pressure of 0.05 psi and $CO_2$.

An example of a pipe with $CO_2$ corrosion is shown in FIG. 2A. When $CO_2$ is present, the most common forms of corrosion include uniform corrosion, pitting corrosion, wormhole attack, galvanic ringworm corrosion, heat-affected corrosion, mesa attack, raindrop corrosion, erosion corrosion, and corrosion fatigue. The presence of carbon dioxide usually means no hydrogen embrittlement. $CO_2$ corrosion rates are greater than the effect of carbonic acid alone. Corrosion rates in a $CO_2$ system can reach very high levels (thousands of mils per year). $CO_2$ corrosion of carbon steel used in oil production and transportation, when liquid water is present, is influenced by a large number of parameters, including: temperature, $CO_2$ partial pressure, flow (flow regime and velocity), pH levels, concentration of dissolved corrosion product (e.g., $FeCO_3$), concentration of acetic acid, water wetting, metal microstructure (welds), metal prehistory (i.e., poor quality steel), and breakdown or damage to protective coatings.

$H_2S$ often is present in wells drilled in shale or sandstone, or near coal or peat deposits or oil fields. $H_2S$ combines with water to form sulfuric acid ($H_2SO_4$), a strongly corrosive acid. Corrosion due to $H_2SO_4$ is often referred to as sour corrosion. Because $H_2S$ combines easily with water, damage to pipelines can be aggressive and severe. An example of a pipe with $H_2S$ corrosion is shown in FIG. 2B.

The activity of microorganisms can change the nature of the aqueous environment which leads to hydrocarbon being degraded, clogging, souring and microbiologically induced corrosion (MIC), and more specifically the localized corrosion of pipeline steel. An example of a pipe with MIC is shown in FIG. 2C.

Statistics regarding age distribution of U.S. pipeline infrastructure are provided in Table 2 below:

TABLE 2

Age Distribution of U.S. Pipeline Infrastructure
(Source: U.S. Dept. of Transportation)

|  | Gas Transmission and Gathering (%) | Hazardous Liquid (%) | Gas Distribution (%) |
| --- | --- | --- | --- |
| 2000s | 9 | 8 | 19 |
| 1990s | 11 | 11 | 21 |
| 1980s | 10 | 9 | 16 |
| 1970s | 11 | 16 | 13 |
| 1960s | 24 | 21 | 15 |
| 1950s | 23 | 20 | 9 |
| 1940s | 8 | 8 | 2 |
| Pre-1940s | 4 | 7 | 5 |

Various statistics regarding pipe failure are illustrated in FIGS. 3A-3D (Source: Western University). FIG. 3A shows the distribution of incidents due to third party excavation (TPE), external corrosion (EC), material failure (MF) and internal corrosion (IC) by the year of installation. FIG. 3B shows the distribution of incidents by pipe diameter. FIG. 3C shows the distribution of incidents by ignition and failure cause, including internal corrosion (IC), external corrosion (EC), third party excavation (TPE), first and second party excavation, (FSPE), previously damaged pipe (PDP), material failure (MF), earth movement (EM), and operations (O). FIG. 3D shows a breakdown of fatalities and injuries by failure mode.

There are several problems with current pipe reconditioning processes. One such process is the insertion of liners. Liner insertion is primarily used for water and sewage pipes but can be used for a variety of applications. Thermoset liners (typically made of Polyvinylchloride (PVC) or Polyethylene (PE)) are dragged into place and inflated and cured using either steam, hot water or heated and pressurized air. While these liners do provide good flow (low drag) characteristics to pipes as well as a corrosive resistant internal boundary, their use is restricted to applications where there are short distances between pipe access points, the pipe does not carry any materials which have any abrasive materials, and the applications have lower pressure requirements. These characteristics mean that liners are unsuitable for long distance pipeline with extended distances (miles) between access points, which transport fluids which contain particulate (including crude oil) and require high pressure.

Other conventional reconditioning processes use a collection of equipment and processes to clear clogging materials and debris from the pipeline, clean and prepare the surface and then spray coat a corrosive resistant coating. These spray coats typically are polymers such as epoxies, polyurethanes or polyureas. However, all these existing processes employ a spray application only which severely limits their ability to fill the deeper recesses in the interior wall of the pipe created by corrosion, create a completely smooth and uniform internal wall surface to allow undisturbed laminar flow of pipeline fluids, replace the pressure containment strength of pipe wall lost to corrosion with a coating which provides inherent structural integrity, and compensate for additional containment strength lost to corrosion to the outside surfaces of the pipe. What is needed is an improved pipe reconditioning system that can prevent a majority of the causes of onshore and offshore hazardous liquid incidents, including onshore and offshore incidents as shown in FIGS. 4A and 4B, respectively (Source: U.S. Dept. of Transportation).

SUMMARY OF THE INVENTION

The present application addresses these shortcomings in the art by providing a manner of rebuilding the wall of a pipe from the inside with a corrosion free epoxy instead of coating the pipe. This solution provides: no erosion and corrosion, no coating failure, fastest time to operations, low installation costs, low maintenance costs, enhanced safety, no degradation of flow performance and no excavation.

The pipe reconditioning system of the present application can rebuild the wall of an aged corroded pipe from the inside of the pipe, maintain pipe integrity and performance, rebuild miles of pipe at a time (and eliminate connections), minimize pipe downtime, compensate for outer surface corrosion, control the minimum wall thickness, use epoxy with a reinforced chopped inorganic fiber blend, adjust the epoxy to supply thermal insulation, minimize flow friction and does not require certification.

The pipe reconditioning system of the present application provides several benefits, including that it can: fill the deeper recesses in the interior wall of the pipe created by corrosion, create a completely smooth and uniform internal wall surface for laminar fluid flow, replace the pressure containment strength of the pipe, create an epoxy layer of unrestricted thickness to allow for greater durability, increased pipeline safety and longer operational life, compensate for additional containment strength lost to corrosion to the outside surfaces of the pipe, provide optional thermal insulation, recondition vertical building pipes, allow field construction of new pipe, and dramatically reduce welded joints (and reduce failure points).

In accordance with an aspect of the present application, a pipeline reconditioning system is provided. The pipeline reconditioning system comprises a pipeline delivery system comprising a control unit and a towable deployment sled configured to deliver and dispense a layer of a reconditioning material to an inner surface of a pipeline; a topside unit comprising one or more material reservoirs and a plurality of spools of pipe for delivering materials from the one or more material reservoirs to the pipeline delivery system; and a delivery system management unit configured to be securely anchored in the pipeline at a first pipeline access point and to communicate with the control unit of the pipeline delivery system.

In accordance with one or more embodiments of the pipeline reconditioning system, the one or more material reservoirs comprise a reservoir of an epoxy resin; a source of glass or basalt chopped fibers; and a reservoir of a hardening material. The one or more material reservoirs further comprise a reservoir of a cleaning solvent configured to clean the pipeline prior to dispensing the reconditioning material.

In accordance with one or more additional or alternative embodiments of the pipeline reconditioning system, the topside unit is a mobile topside unit configured to be movable by a vehicle. The topside unit may also comprise a storage unit configured to store the pipeline delivery system.

In further embodiments of the pipeline reconditioning system, which may include any of the aforementioned embodiments, the towable deployment sled comprises a plurality of wheels and is secured to a towing cable in communication with the delivery system management unit, which is configured to tow the deployment sled towards the delivery system management unit while dispensing the reconditioning material. The pipeline delivery system receives a primary cable assembly from the topside unit and the delivery system management unit, the primary cable assembly comprising: a first pipe configured to carry the epoxy resin from the reservoir of the epoxy resin; a second pipe configured to carry the hardening material from the reservoir of the hardening material; the towing cable; a control cable configured to connect to the control unit of the pipeline delivery system; and a power cable configured to connect to the control unit of the pipeline delivery system and supply electric power to the pipeline delivery system from a power supply. The primary cable assembly may further comprise a supply line carrying the glass or basalt chopped fibers from the source of the glass or basalt chopped fibers. In various embodiments of the pipeline reconditioning system, the pipeline delivery system further comprises a mixing unit configured to mix together two or more of the epoxy resin, the glass or basalt chopped fibers, and the hardening material to create the reconditioning material to be applied to the inner surface of a pipeline. The towable deployment sled may comprise the mixing unit, one or more distribution passages configured to receive the reconditioning material from the mixing unit, and one or more pressurized distributors at ends of the one or more distribution passages configured to dispense and apply the layer of the reconditioning material to the inner surface of the pipeline. The one or more pressurized distributors may comprise a hinge mechanism comprising a plurality of spring-loaded panels connected to a body of the deployment sled and having curved tips, wherein the hinge mechanism is positioned in front of an opening dispensing the reconditioning material in the direction of travel of the deployment sled and is configured to block leakage of the reconditioning material in front of the opening.

In one embodiment of the pipeline reconditioning system, the one or more pressurized distributors further comprise: one or more nozzles configured to dispense the reconditioning material, and a guide blade configured to apply the reconditioning material to the inner surface of the pipe at a predetermined and consistent layer thickness. In another embodiment of the pipeline reconditioning system, the one or more pressurized distributors further comprise an extruder configured to dispense the reconditioning material at a predetermined and consistent layer thickness. In a further embodiment of the pipeline reconditioning system, the one or more pressurized distributors further comprise one or more nozzles configured to rotate circumferentially and dispense the layer of the reconditioning material to the inner surface of the pipeline. In a still further embodiment of the pipeline reconditioning system, the one or more pressurized distributors further comprise a plurality of nozzles arranged around a static disk configured to dispense the layer of the reconditioning material to the inner surface of the pipeline.

In various embodiments of the pipeline reconditioning system, including any of the aforementioned embodiments, the pipeline delivery system further comprises a curing device configured to cure the layer of reconditioning material applied to the inner surface of the pipeline with ultraviolet or microwave radiation.

In accordance with one or more additional or alternative embodiments of the pipeline reconditioning system, the delivery system management unit further comprises one or more sleds configured to be secured to the towing cable and provide the towing cable to the delivery system in the pipeline. The pipeline reconditioning system may also comprise a line towing unit arranged at a second pipeline access point, the line towing unit configured to supply a towing line into the pipeline configured to be transported to the first pipeline access point through the pipeline and to pull the primary cable assembly from the first pipeline access point to the second pipeline access point via the towing line, wherein the pipeline delivery system receives the primary cable assembly at the second pipeline access point and travels towards the first pipeline access point while dispensing the reconditioning material to the inner surface of the pipeline.

In accordance with a further aspect of the present application, a pipeline reconditioning method is provided, comprising: arranging within a pipeline, a pipeline delivery system comprising a control unit and a towable deployment sled configured to dispense a layer of a reconditioning material to an inner surface of the pipeline; providing one or more materials to the pipeline delivery system from one or more material reservoirs disposed in a topside unit comprising the one or more material reservoirs and a plurality of spools of pipe for delivering the one or materials from the one or more material reservoirs to the pipeline delivery system; and towing, by a delivery system management unit, the towable deployment sled through the pipeline while the towable deployment sled is dispensing the reconditioning material to the inner surface of the pipeline, the delivery system management unit comprising configured to be securely anchored in the pipeline at a first pipeline access point and to communicate with the control unit of the pipeline delivery system.

In one or more embodiments of the pipeline reconditioning method, the one or more materials provided to the pipeline delivery system comprise one or more of an epoxy resin, glass or basalt chopped fibers, and a hardening material. The method may further comprise mixing together the one or more materials provided to the pipeline delivery system by a mixing unit of the pipeline delivery system to create the reconditioning material to be applied to the inner surface of a pipeline. In further embodiments, the pipe reconditioning method also comprises dispensing and applying the layer of the reconditioning material to the inner surface of the pipeline by one or more pressurized distributors arranged on the deployment sled. In further embodiments, the pipe reconditioning method comprises curing the layer of the reconditioning material applied to the inner surface of the pipeline with ultraviolet or microwave radiation.

BRIEF DESCRIPTION OF THE FIGURES

FIGS. 5A-5B show fluid flow characteristics post-reconditioning process using a conventional coating system and a pipe reconditioning system of the present application;

FIGS. 6A and 6B depict extracts from FIGS. 5A and 5B, respectively;

FIGS. 13A-13L show an example pipe reconditioning process for a horizontal operating sequence;

FIG. 16 shows a cross-sectional view of a pipe load profile;

FIG. 17 shows a cross-sectional circular extruded chopped filament pipe; and

FIG. 18 shows a cross-sectional ovular extruded chopped filament pipe.

DETAILED DESCRIPTION OF THE INVENTION

Figure 1:
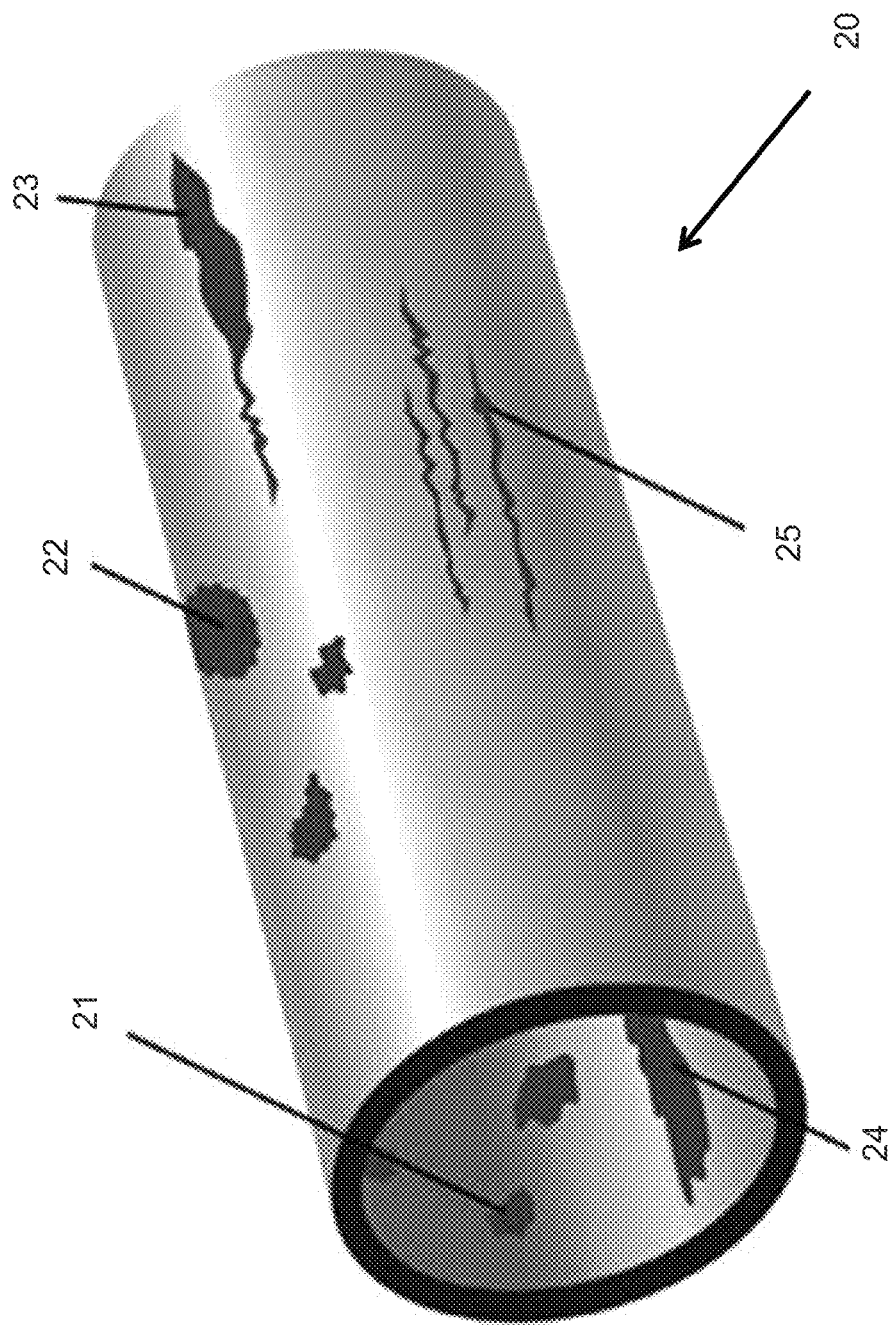
FIG. 1 shows examples of pipe corrosion.
Figure 2A:
FIG. 2A shows an example of a pipe with carbon dioxide corrosion.
Figure 2B:
FIG. 2B shows an example of a pipe with $H_2S$ corrosion.
Figure 2C:
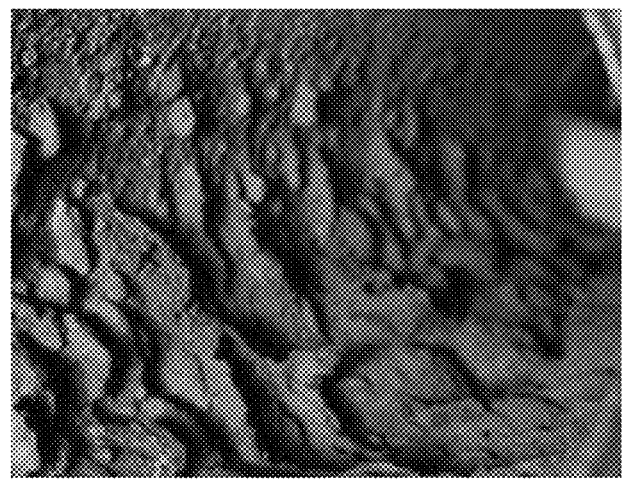
FIG. 2C shows an example of a pipe with microbiologically induced corrosion.
Figure 3A:
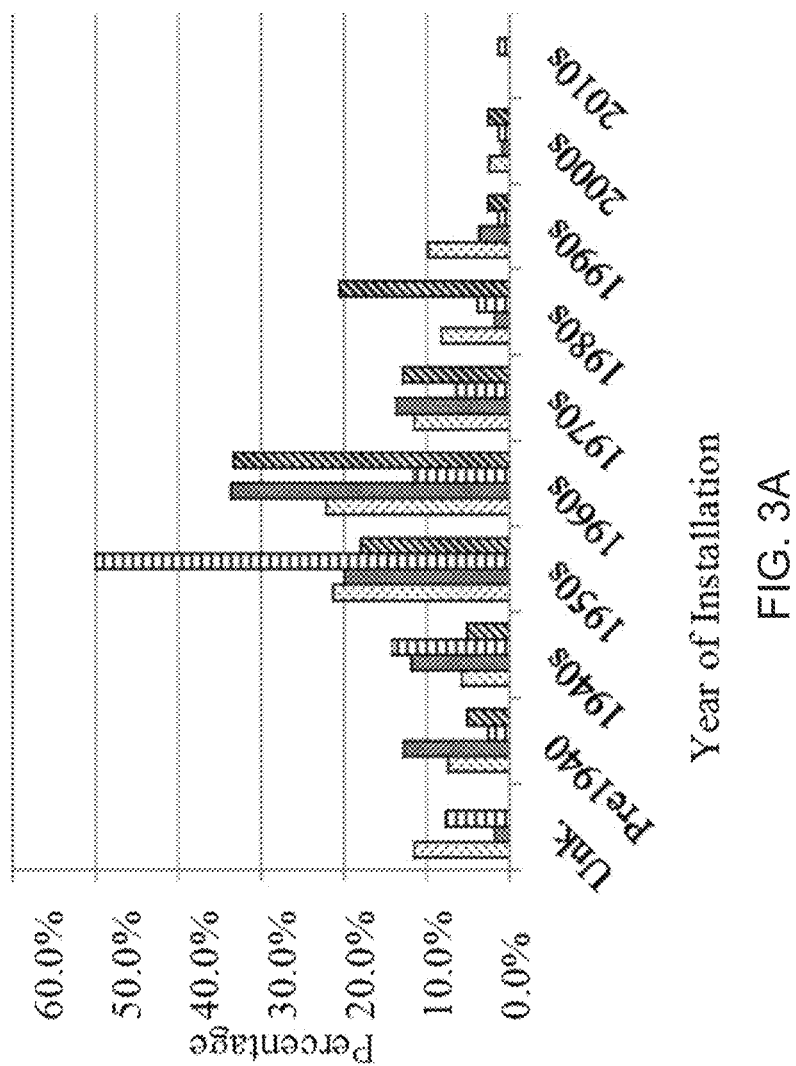
FIGS. 3A-3D show various statistics regarding pipe failure.
Figure 3B:
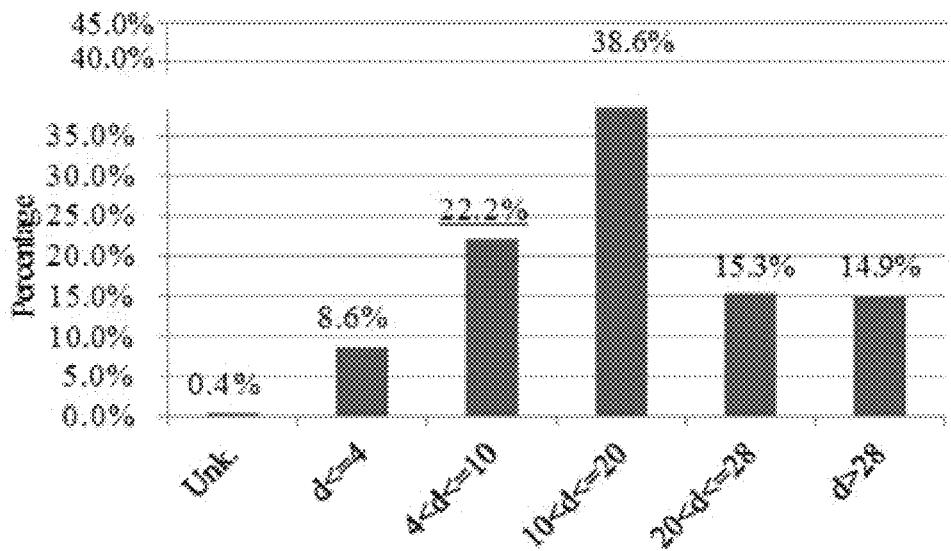
Figure 3C:
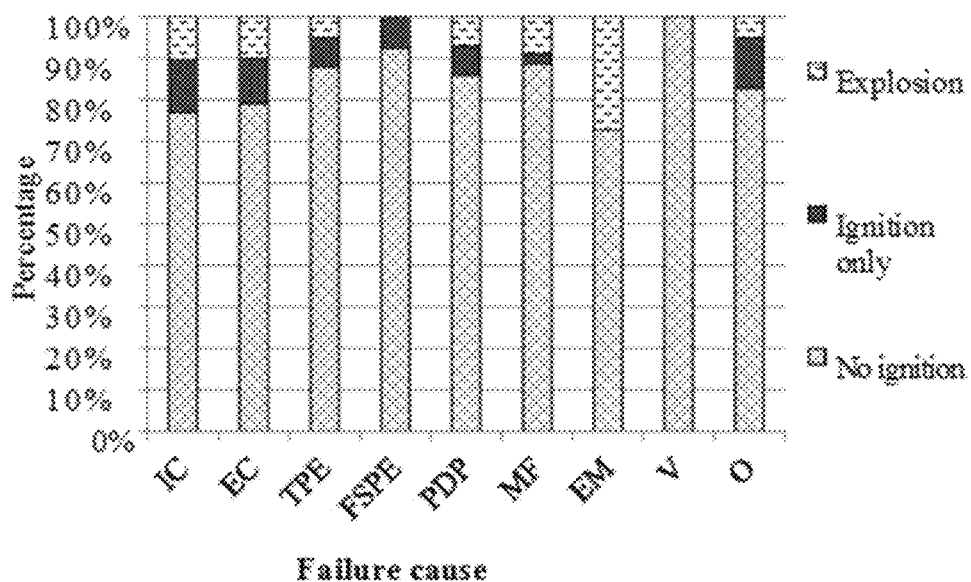
Figure 3D:
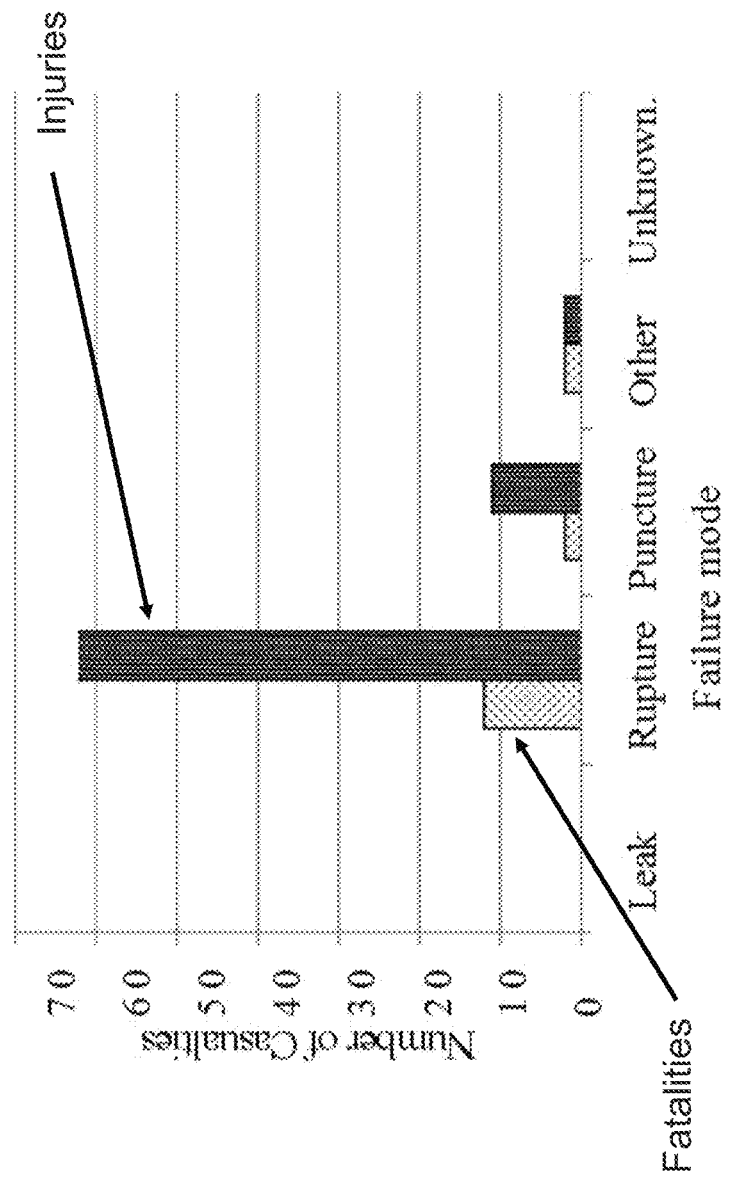
Figure 4A:
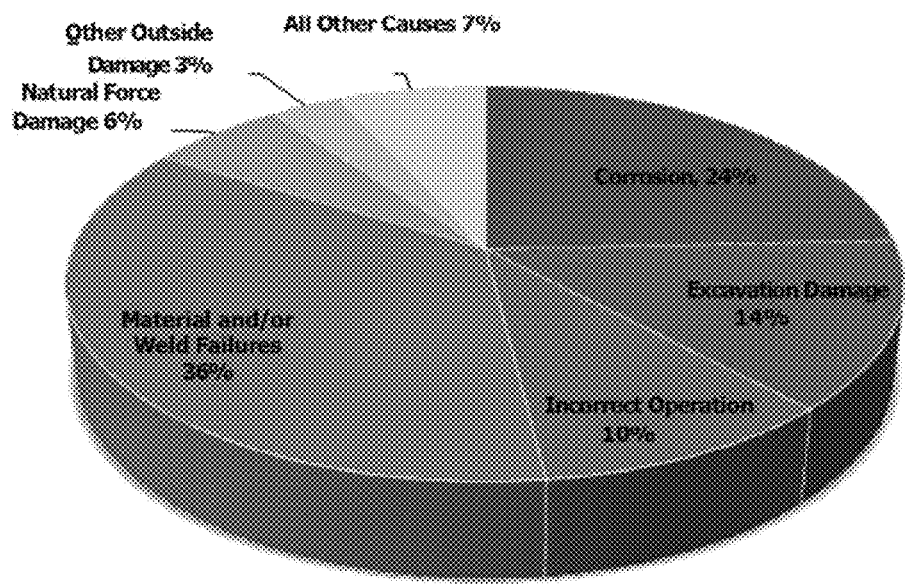
FIGS. 4A-4B show various statistics regarding pipeline incidents.
Figure 4B:
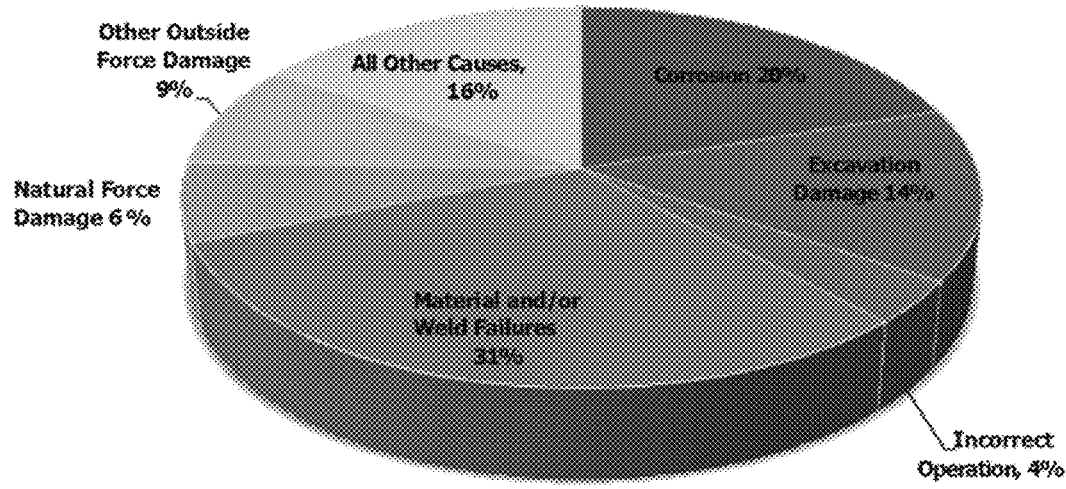

The pipe reconditioning system of the present application will now be described with reference made to FIGS. 5A-18.

FIGS. 5A-6B illustrate fluid flow characteristics post-reconditioning process using conventional coating systems (FIGS. 5A and 6A) versus a pipe reconditioning system described herein (FIGS. 5B and 6B).

In the pipe 50a, a conventional spray coating 52a is applied against a heavily corroded pipe wall 51a profile. While the coating 52a covers the inner pipe surface 55a, the overall fluid flow profile 53a is still uneven causing turbulent fluid flow. In contrast, FIGS. 5B and 6B illustrate a profile of rebuilding the interior 55b of the wall 51b of the pipe 50b against the same wall profile 51a, by applying an epoxy layer coating 52b that may also include chopped fiber, using a pipe reconditioning process described herein. The reconditioned flow profile 53b is even and smooth, allowing laminar fluid flow.

FIGS. 6A and 6B depict extracts from FIGS. 5A and 5B, respectively. The Figures illustrate the structural strength of the pipe 50a, 50b after the reconditioning process, and the improved distribution of load on the pipe wall 51b in the case of deep wall corrosion. Conventional coating 52a with epoxy will cover the corroded surface 55a and provide corrosion protection; however, such a coating 52a will not augment the pressure containment capacity of the pipe 50a and will institutionalize a point of weakness and potential failure for the lifetime of the pipe 50a. Full pipe pressure 56a is exerted on all areas of fissure. A layer 52b of epoxy applied with the pipe reconditioning system described herein will re-establish structural integrity and pressure containment abilities by distributing reduced pressure 56b over a larger surface area. Thicker layers 52b of epoxy may be applied in a manner calculated to compensate for additional corrosion and erosion to the outside surface 54b of the pipe. The inclusion of chopped fiber in the epoxy can augment the structural strength of the epoxy layer 52b being applied. The alignment of the fibers in the epoxy applied through a nozzle is designed for this purpose as another aspect of the application further augments the strength of the layer 52b of epoxy. A conventional spray coating system may not completely restore a clean profile to the surface 55a of the pipe 50a in the case of deep pitting and fissures, and any recesses or hollows remaining will be subject to additional fatigue created by the changing pressure characteristics at that point caused by a breakdown in the laminar flow 53a of the fluid and ensuing turbulence at that point.

FIGS. 6A and 6B depict the deployment of coating and an epoxy layer 52a, 52b on the inside 55a, 55b of the pipe 50a, 50b to recondition the pipe 50a, 50b, but have been simplified and do not take into account the corrosion that also takes place on the outside surface 54a, 54b of the pipe 50a, 50b. When taken together, these interior and exterior corrosion activities combine to incrementally reduce the pipe pressure containment capability ("PPCC"). The conventional coating 52a in FIG. 6A provides little or no augmentation of the PPCC once that reconditioning process is completed. However, the layer 52b of epoxy, including chopped fiber for structural strength, deployed as part of the pipe reconditioning system of FIGS. 5B and 6B restores structural strength.

Figure 6C:
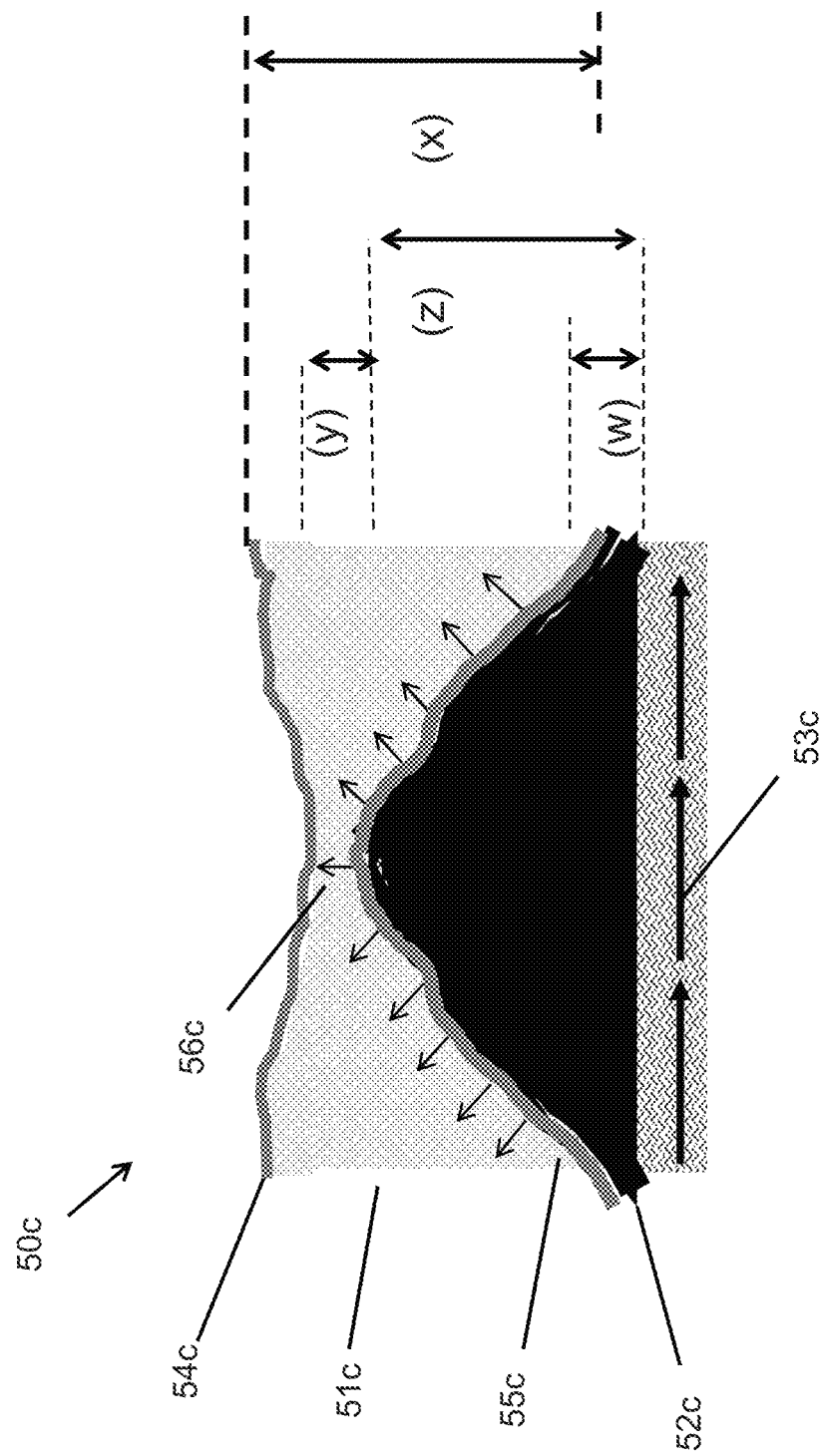
FIG. 6C show a reconditioned pipe having internal and external corrosion in accordance with an aspect of the pipe reconditioning system of the present application.

As shown in FIG. 6C, the combined effects of corrosion and erosion on the outer pipe wall surface 54c and inner pipe wall surface 55c have reduced the thickness of the pipe wall 51c of the pipe from original wall thickness (x) to corroded wall thickness (y). With the incremental layer 52c of epoxy containing chopped fiber (w) applied across the whole surface 55c of the pipe 50c, the depth of the epoxy 52c at the point of deepest corrosion is the effective restored wall thickness (z). As the thickness (w) increases, the overall PPCC of the pipe can re-establish the original pressure containment capability of the pipe 50c, although the open cross section of the pipe 50c will be marginally diminished. The pressure 56c is reduced, being distributed over a larger surface area and an even fluid flow profile 53c is provided.

Figure 6D:
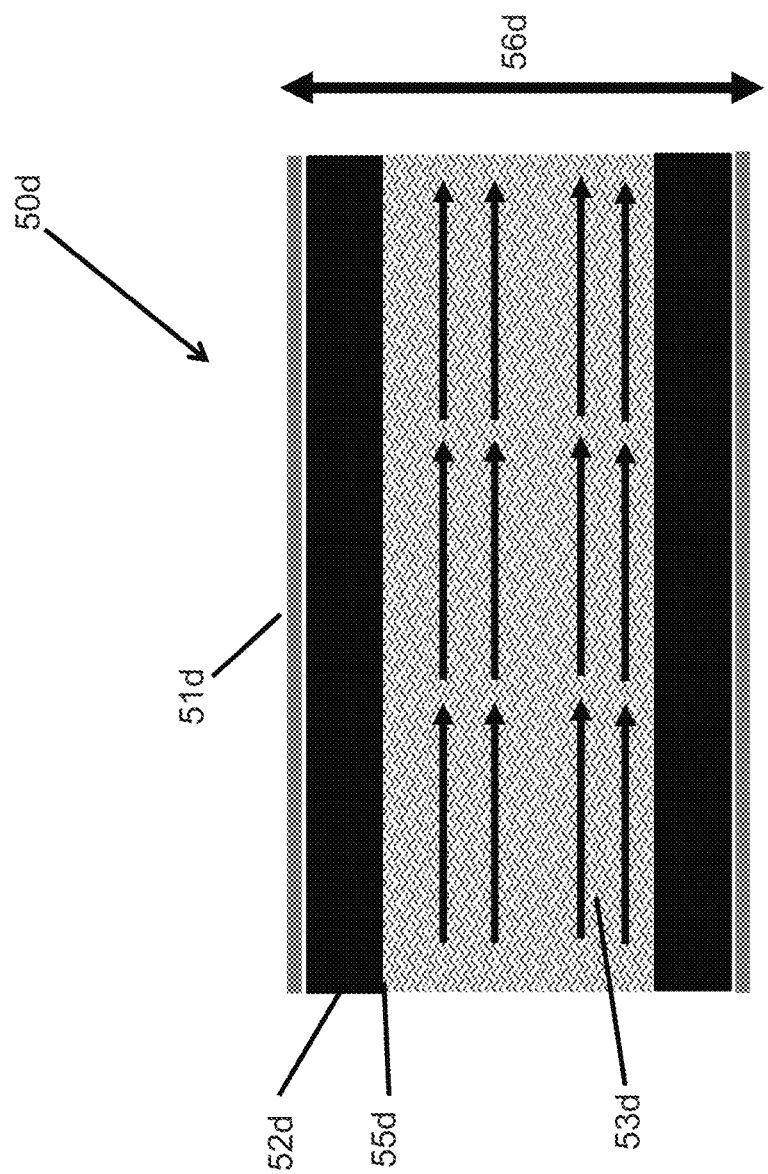
FIG. 6D shows an example an extruded chopped filament pipe (EFCP) for new pipe installations in accordance with an aspect of the present application.

FIG. 6D illustrates an example of the effectiveness in deploying epoxy using extruded chopped filament pipe (EFCP) 50d for new pipe installations. The EFCP 50d has an outer track pipe wall 51d, which can be made of various materials including plastics, and an inner chopped fiber epoxy layer 52d. The pipe 50d has an even fluid flow profile 53d, with full pipe pressure 56d being exerted on the pipe inner surface 55d and all areas of fissure.

The reconditioning portion of the process deploys the pipeline reconditioning system. The pipeline reconditioning system comprises a mobile topside unit 200, an example of which a shown in FIG. 7, a control unit 300 and tow unit 305 securely anchored in the pipeline 250 at remote access points 260 and a towed array 400 comprising a control unit 409, a resin system processor 408 and a deployment sled 405.

Figure 7:
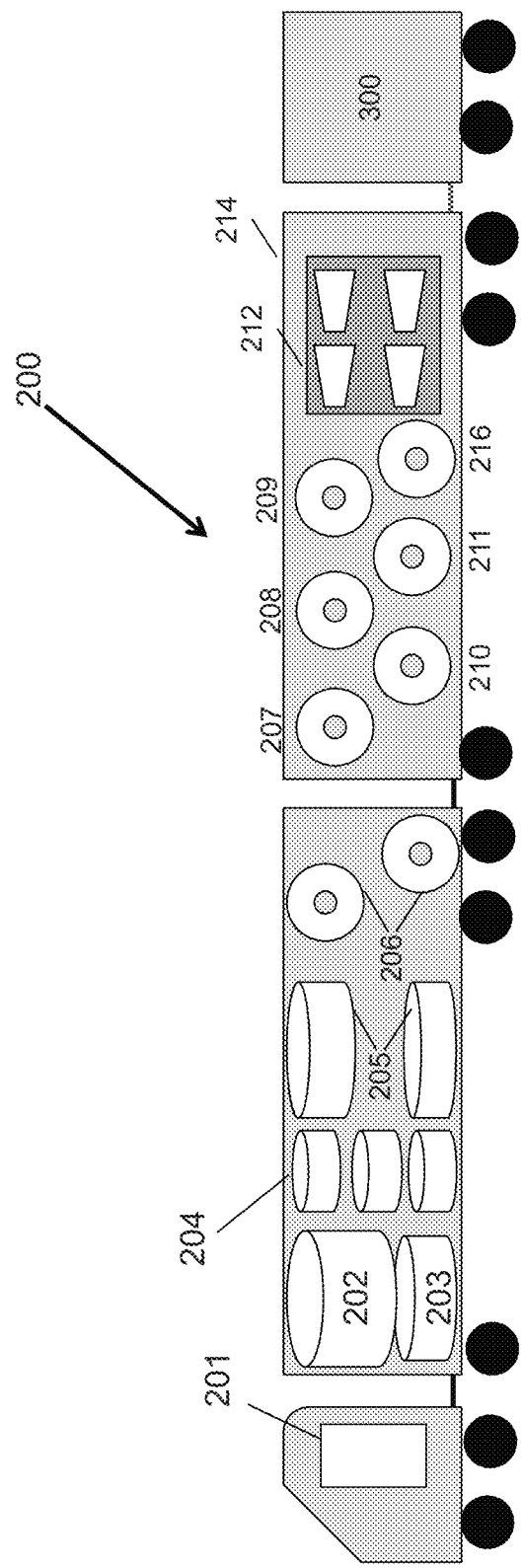
FIG. 7 shows a mobile topside unit of a pipeline reconditioning system in accordance with an embodiment of the present application.

The main topside unit 200 may be a mobile, self-contained unit, as shown in FIG. 7, which may comprise a control unit/sensor management device 201, a primary resin reservoir 202, a primary hardener reservoir 203, cleaning solvent and flusher reservoirs 204, finishing resin and hardener reservoirs 205, sources of spooled glass and basalt 206 for chopped fiber delivery, spooled pipe 207 for resin delivery, spooled pipe 208 for delivery of cleaning solvents and flushers, spooled sensor cables 209, spooled tow cables 215, spooled power cables 216, spooled pipe 210 for hardener delivery, spooled pipes 211 for finishing system delivery, storage 212 for the pigs 220, deployment sled 405 and towed robotic delivery system 400 and a delivery system management unit 300, including power systems and cable management systems. The mobile topside unit 200 is towable by a truck or other vehicle, is able to move from one pipeline access point 260 to the next pipeline access point 260.

Figure 8:
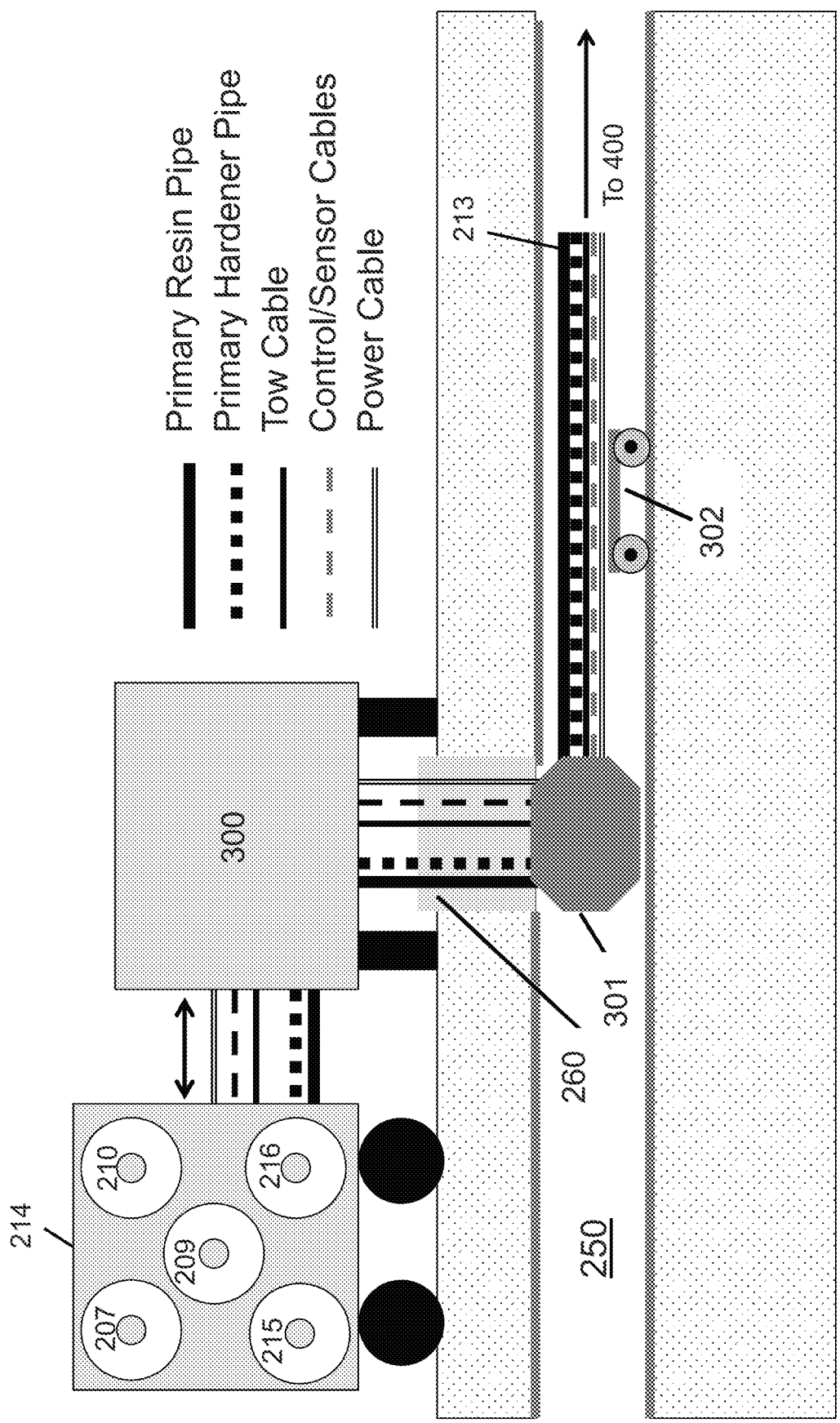
FIG. 8 shows a delivery system management unit of a pipeline reconditioning system in accordance with an embodiment of the present application.

An example of a delivery system management unit 300 for the primary epoxy resin system deployment is shown in FIG. 8. The delivery system management unit 300 is arranged over and anchored at a pipeline access point 260. A spool management trailer 214 comprising least primary resin delivery pipe 207, primary hardener delivery pipe 210, tow cables 215, control/sensor cables 209 power cables 216 are provided with the delivery system management unit 300. Collectively, these pipes and cables are included a primary cable assembly 213 for use by the delivery system 400 in the pipeline 250. The primary cable assembly 213 may include other cables and/or pipes as appropriate to provide a further input to the delivery system 400, including for example the chopped fiber 206 or a pipe, delivery system or supply line for the same. An anchored tow robot manager 301 is provided inside the pipeline 250, which provides the primary cable assembly 213 to the delivery system 400. One or more detachable load bearing sleds 302 are provided, which can be attached to the tow cable 215 approximately every thirty feet to support the weight of the primary cable assembly 213. The cables 209, 215, 216 and pipes 207, 210 supplied to the delivery system management unit 300 can be extended or retracted into and out of the spool management trailer 214 into the pipeline 250 as needed using the delivery system management unit 300.

The delivery system 400, also referred to as a towed, robotic delivery system, is configured in the pipeline 250 to deploy or delivery an epoxy 402 inside of the pipe 250 to recondition the pipe 250. The delivery system 400 comprises a deployment sled 405 having a plurality of guide wheels 406 to move through the pipeline 250 and one or more sensors 407. The primary cable assembly 213 is provided to the delivery system 400 and aids in the primary operations of the delivery system 400. The resin pipe 207 and the hardener pipe 210 are connected to the intake of a mixing unit 408 on the deployment sled 405, which receives the resin and hardener from the reservoirs 202, 203 and mixes them together for deployment. Other inputs may also be provided to the mixing unit 408 from the mobile topside unit 200, separately or in combination with the resin 202 or hardener 203, such as the cleaning, solvent or flushing fluids 204, glass or basalt fibers 206 or the finishing resin and/or hardener 205. The mixer 408 is in fluid communication with one or more deployment passages 408a, having a nozzle 404 or other pressurized deployment mechanism at their respective ends to distribute the mixed epoxy 402. The tow cable 215 is secured to a tow point on the deployment sled 405 and is configured to tow the deployment sled 405 towards the delivery system management unit 300 and the anchored tow robot manager 301. The control cable 209 and power cable 216 are connected to a control unit 409 of the delivery system 400. The power cable 216 supplies electric power to the delivery system 400 and its components, such as the sensors 407, mixing unit 408, and control unit 409 for example, from an above-ground power source, which may be in the management unit 300. The control cables 209 are configured to transmit control commands from the delivery system management unit 300 and/or the control unit/sensor management device 201 to the control unit 409 and send data and information from the control unit 409 to the delivery system management unit 300 and/or the control unit/sensor management device 201. For example, data and information from the sensors 407 are processed by the control unit 409 and transmitted along the control cable 209. The delivery system management unit 300 and the control unit/sensor management device 201 may each comprise a computing device with memory and processor, which may comprise instructions for providing an automated operation of the delivery system 400 or may be manually operated by a user above ground. A further trailer cable 410 is also connected to the deployment sled 405, which enters the pipeline from a separate access point, as shown in FIGS. 13A-13L.

The design and configuration of the deployment sled 405 may vary depending on which resin system is being applied to the internal surface 251 of the pipe 250. Initial surface cleaning, including treatment for under deposit corrosion and preparation may be performed by robotic pigs and/or other independently powered mechanisms (with or without towing mechanisms). During this process the pipeline 250 may either be filled, sprayed or scoured with cleaning solutions 204. The epoxy deployed is a multi-part system which may include silicates and other particulate and is designed to be thixotropic, even in a pre-cured state. In another aspect of the application, the epoxy may include a photo initiator to cure the outer layer of the epoxy prior to completing curing of epoxy layer 252. Chopped fiber 206 can be cut to specific lengths for the application and may include glass fiber, basalt fiber, and other suitable materials.

Figure 9A:
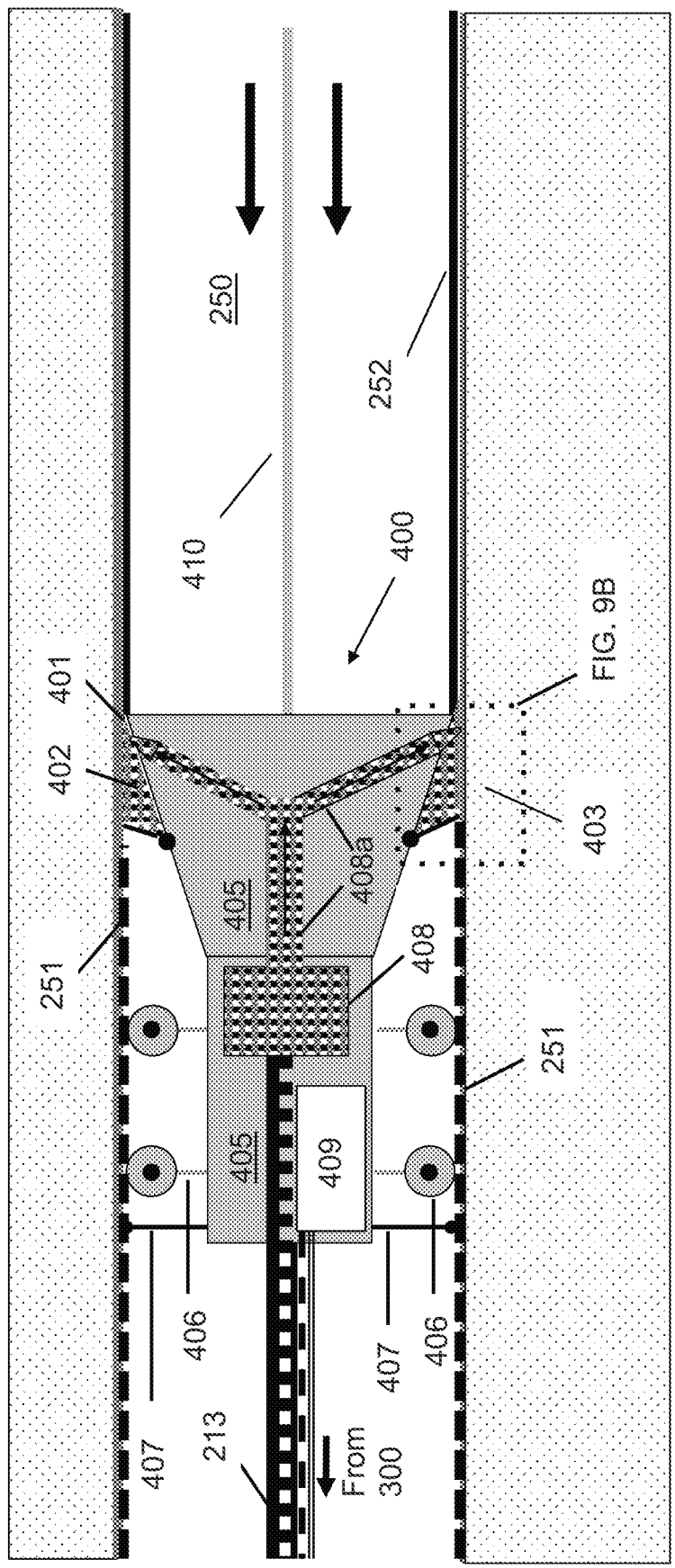
FIG. 9A shows a towed robotic delivery system of a pipeline reconditioning system in accordance with an embodiment of the present application.

In one embodiment, the towed robotic delivery system 400 includes a guide 401 which acts like a "Doctor Blade", precisely deploying a continuous supply of epoxy 402 evenly and at a predetermined thickness across the internal surface 251 of the pipe 250. An example of this embodiment is shown in FIG. 9A. A managed buildup of epoxy 402 in front of the blade 401 (in the direction of movement of the deployment sled 405) ensures that sufficient epoxy 402 is available to fill even deep pitting and cavities in the pipe 250.

Figure 9B:
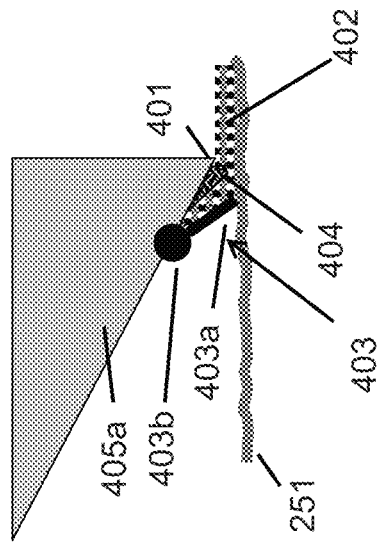
FIG. 9B shows a side view of a hinge mechanism of the towed robotic delivery system of a pipeline reconditioning system in accordance with an embodiment of the present application.
Figure 9C:
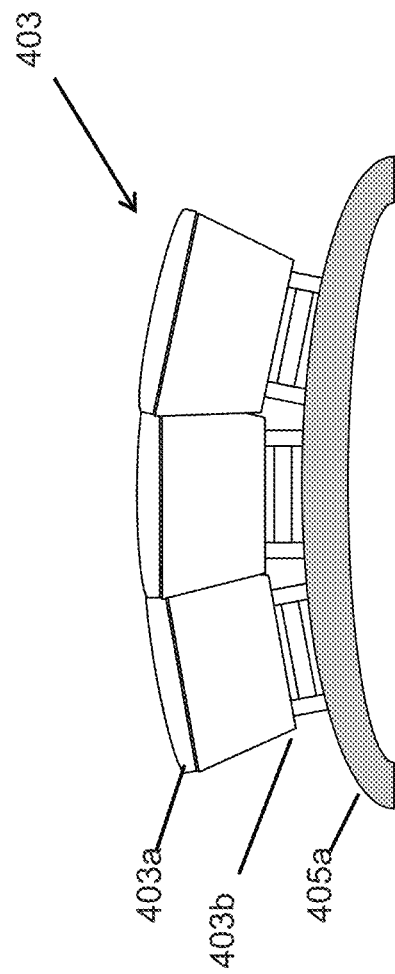
FIG. 9C shows an end view of a hinge mechanism of the towed robotic delivery system of a pipeline reconditioning system in accordance with an embodiment of the present application.

Designed as an integral part of the delivery system 400, spring-loaded hinge mechanisms 403 are attached to the body 405a of the deployment sled 405 at a point adjacent to, but just ahead of (relative to the direction of travel) the specialty nozzles 404 deploying the epoxy resin layer 402 to the internal surface 251 of the pipe 250. Examples of the hinge mechanism 403 of the delivery system 400 are shown in FIGS. 9B and 9C. Since the epoxy 402 is being deployed under pressure, it is critical that the system 400 prevents leakage ahead of the sled 405 (i.e., in the direction of travel identified by two parallel arrows in FIGS. 9A, 10 and 11), and creates a consistent pressure of epoxy 402 delivery to the surface of the pipe 250. The tips or plates 403a of the spring-loaded panels 403b that collectively make up the hinge mechanism 403 are preferably curved to the radius of the pipe 250, as shown in FIG. 9C, and maintain constant contact with the surface 251 of the pipe 250. A plurality of plates 403a and spring-loaded panels 403b are provided that can move independently from each other, so that their collective shape can conform to irregular surfaces 251. The tips 403a may overlap and are also retractable towards the body 405a of the deployment sled 405 if there is a need to pull the robotic system 400 back to the point of origin for any reason, such that they can be brought out of contact with the pipe surface 251.

Figure 10:
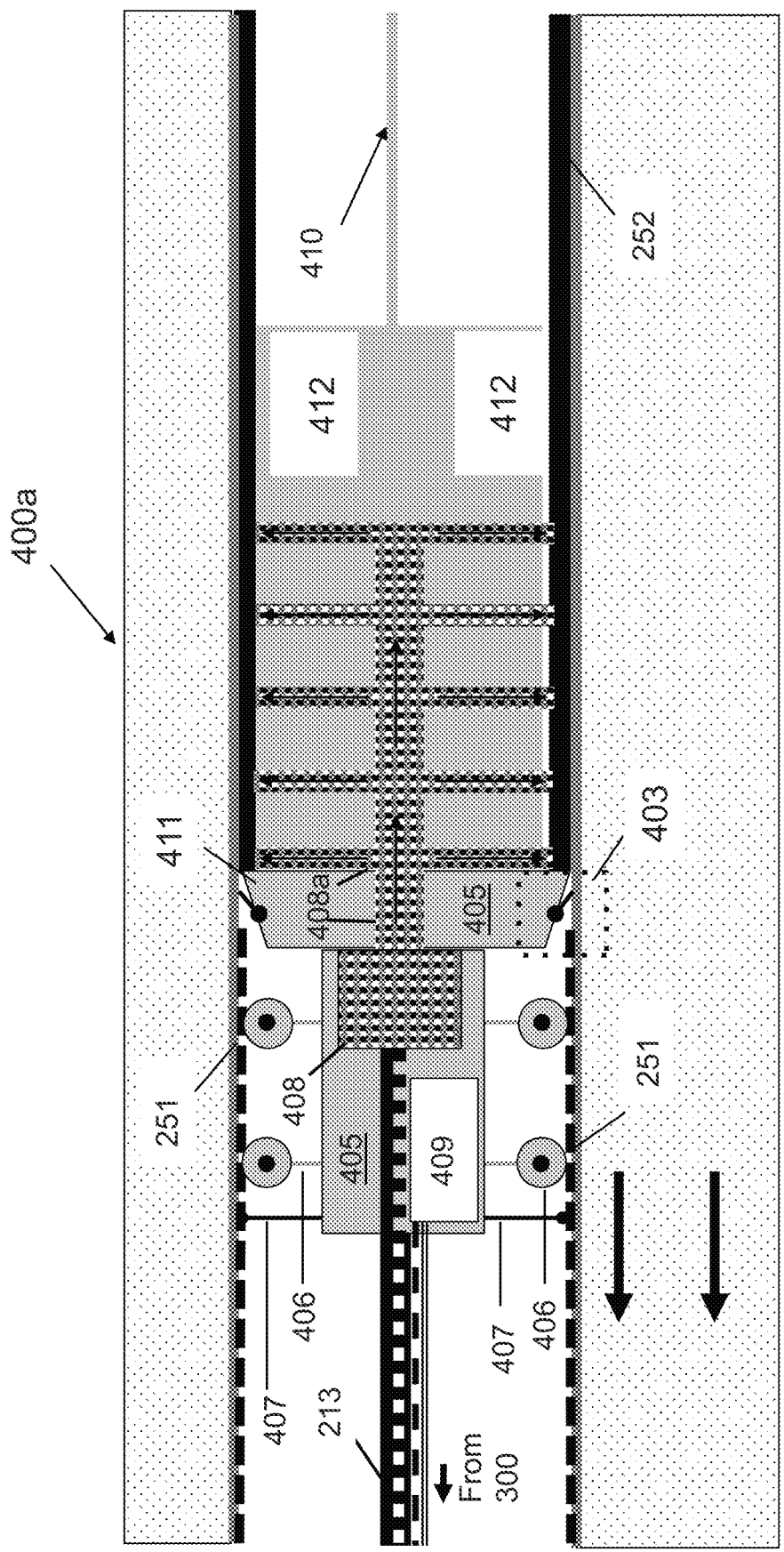
FIG. 10 shows a towed robotic delivery system of a pipeline reconditioning system in accordance with a further embodiment of the present application.

In another embodiment of the towed robotic delivery system 400a shown in FIG. 10, the system 400a includes a trailed, extruder form 411 which may have a wider opening than a nozzle 404 and which acts like a mold allowing for the deployment and forming of a thicker layer 252 of epoxy 402 evenly and at a predetermined thickness across the internal surface 251 of the pipe 250. Sufficient epoxy 402 is available to fill even deep pitting and cavities in the pipe 250. A foaming agent may be added to increase the volume and penetration of the epoxy 402. An optional curing mechanism 412 can be added to the system 400a to solidify the layer 252 of epoxy 402. Two examples of the curing mechanism 412 are ultraviolet radiation and microwaves.

Figure 11:
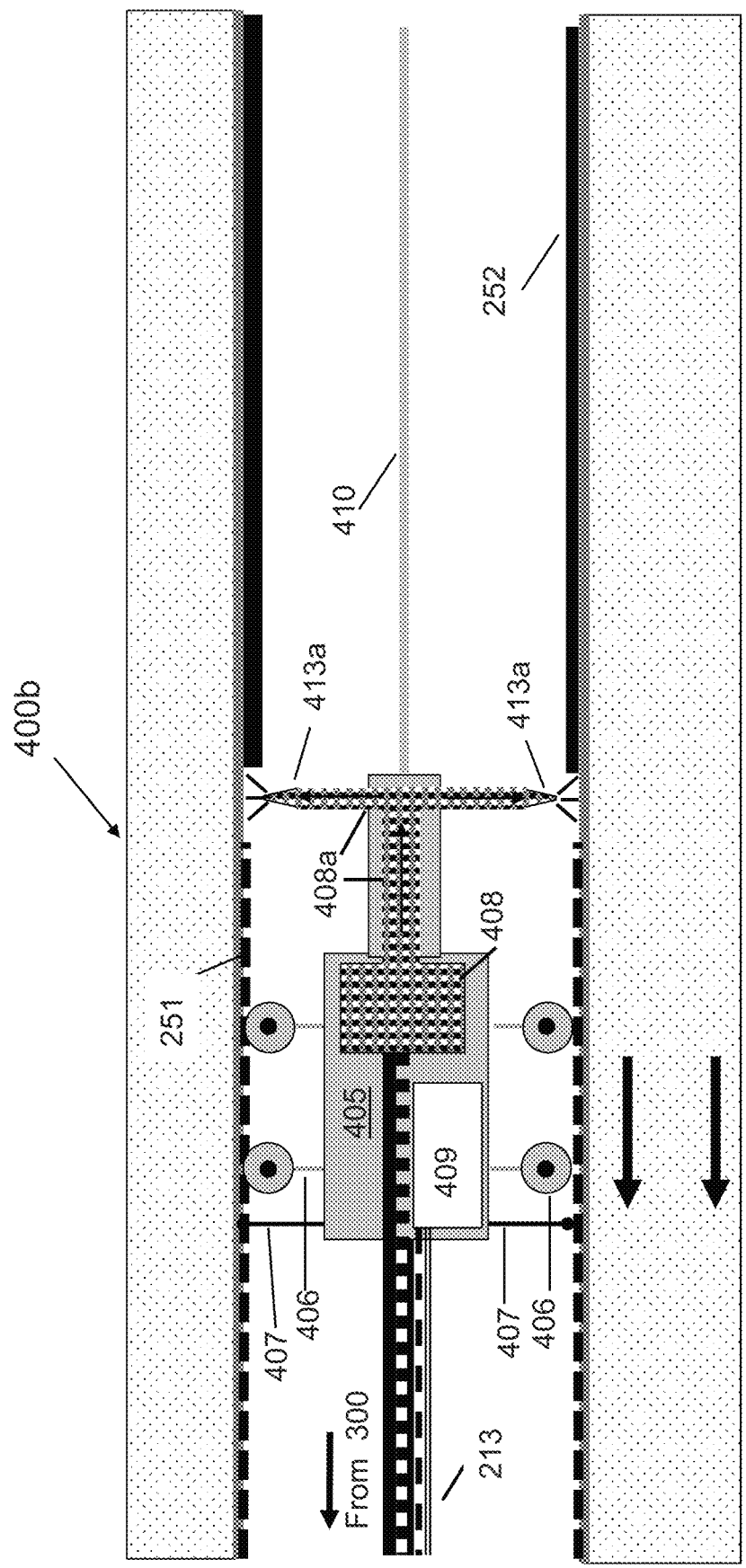
FIG. 11 shows a towed robotic delivery system of a pipeline reconditioning system in accordance with a further embodiment of the present application.
Figure 12B:
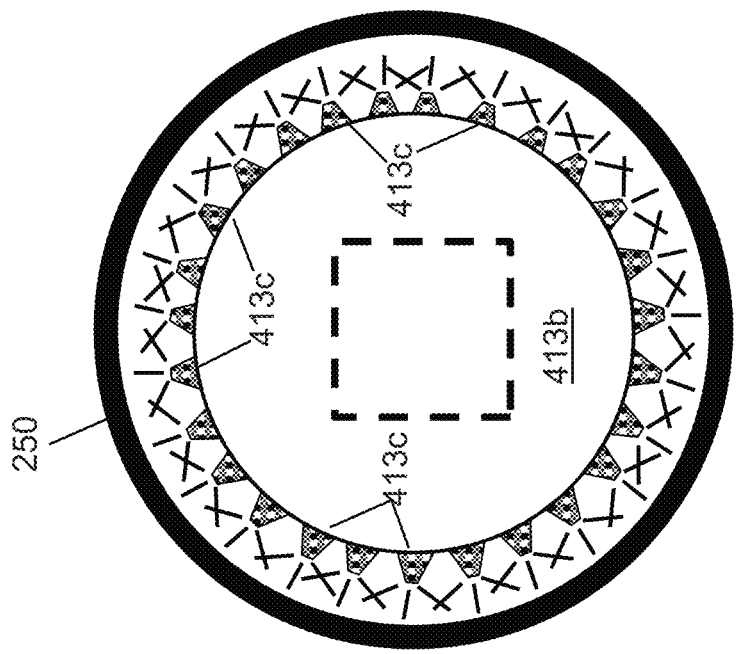
FIG. 12B shows a nozzle mechanism towed robotic delivery system of a pipeline reconditioning system in accordance with a further embodiment of the present application.
Figure 12A:
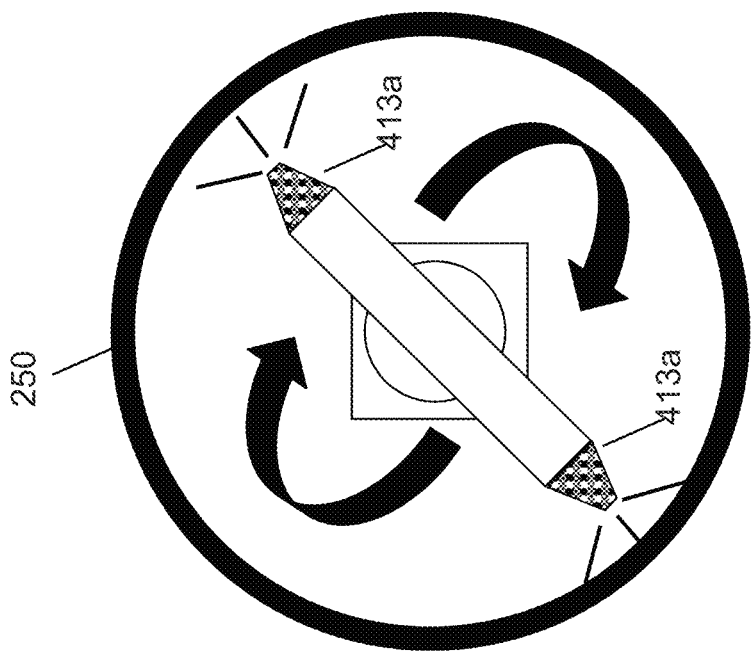
FIG. 12A shows a nozzle mechanism towed robotic delivery system of a pipeline reconditioning system in accordance with an embodiment of the present application.

Further embodiments of the towed robotic delivery system 400b of the pipe reconditioning system for adding a coating include the trailed array system 400b with either (i) spinning nozzles 413a or (ii) a static disc 413b with multiple nozzles 413c, examples of which are shown in FIGS. 11-12B. Each embodiment is designed to coat the internal surface 251 of the pipe 250 with a thin layer 252 of a special coating. This pipeline delivery system 400b may be used as a preventative measure for newer pipes. It may also be used as a final coating process after the pipe reconditioning system 400, 400a, 400c has been used to deploy a corrosion resistant, resin coating that optimizes flow. This system 400b can be used to deploy a layer 252 of coating to reduce the drag effect of the pipe wall, reducing energy requirements for pumps, as shown for example in FIGS. 12A and 12B. FIG. 12A illustrates a spinning nozzle 413a design geared to speed of travel of array for uniform coverage. The spray arm 413a is configured for full circumferential rotation and is customizable to diameter of pipe 250. FIG. 12B illustrates a design having multiple nozzles 413c attached to static disc 413b customizable to diameter of pipe 250. The nozzles 413a, 413c in each embodiment can be interchanged based upon flow rates, coverage and epoxy. The delivery system 400b may also be used to provide a coating of the same epoxy 402 as distributed by the previously discussed delivery systems 400, 400a.

The orientation of chopped fiber changes the properties of pipe. The structural characteristics of a wound composite pipe is determined by the angle of the wound thread, the weight of the wound thread, the material of the wound thread, the epoxy used and the thickness of the pipe wall. The structural characteristics of a chopped fiber composite pipe is determined by the angle of the chopped fiber in the pipe wall, the weight of the chopped thread, the length of the chopped thread, the material of the wound thread, the epoxy used and the thickness of the pipe wall. The pipe reconditioning system adjusts the chopped thread orientation during the reconditioning to meet the application performance requirements. This can be done on a real time basis.

The pipe reconditioning process can comprise several steps, including: (1) internal pipeline assessment and reconditioning plan development, (2) conventional or mechanical pig excoriation, (3) debris removal, (4) pipeline cleaning and surface preparation, (5) pipeline surface assessment reconditioning plan finalization, (6) primary reconditioning pass performed using primary epoxy resin system based upon pipeline operating characteristics and requirements, (7) primary epoxy resin system including chopped fiber (E-CR glass, basalt or other fiber) to increase structural strength and fill larger cavities, (8) curing process which may include the use infrared, ultraviolet, microwave or e-beam radiation, steam, hot air or other gaseous mix, (9) pipeline assessment, (10) secondary reconditioning pass with secondary coating system designed to offer durability and exceptional low drag co-efficient surface, and (11) pipeline inspection and certification for service. It should be noted that depending on the requirements of the pipe 250 requiring reconditioning, one or more of the above-identified steps can be omitted from the pipe reconditioning process. FIGS. 13A-13L illustrate an example pipe reconditioning process for a horizontal operating sequence, including the above-referenced steps. The process can be performed using any of the previously discussed delivery systems 400, 400a, 400b, which are not limited to use with delivery of any particular materials described herein.

One of the key attributes of the pipe reconditioning process is that entire sections of pipeline 250 can be reconditioned between existing inspection or access points. A sequence of operations is described below between three consecutive access points 260a, 260b, 260c, which can be arranged up to several kilometers apart.

Figure 13A:
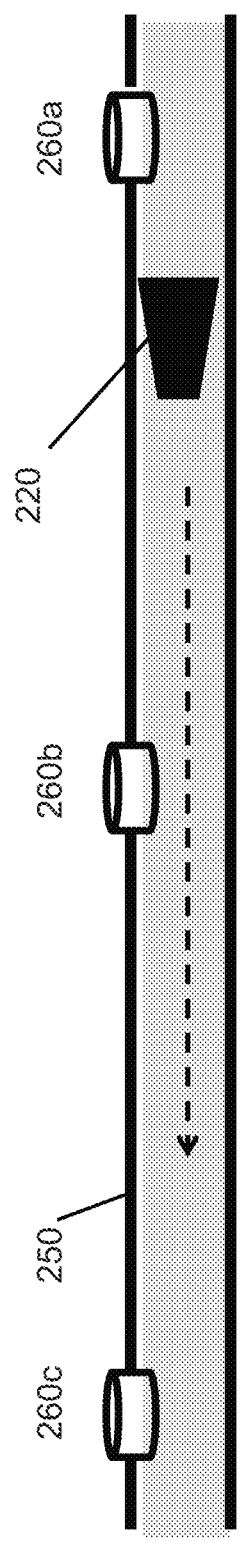

In steps (1), (2) and (3) noted above, the pipeline 250 is assessed and then cleared with conventional pigs 220 driven by compressed air or water, and debris is removed, as shown in FIG. 13A. Cleaning may involve "passivizing" the surface of the pipe wall, adjusting the pH and chloride levels with inhibited water runs, and solvent runs to dry the pipeline including the removal of under deposit corrosion.

Figure 13B:
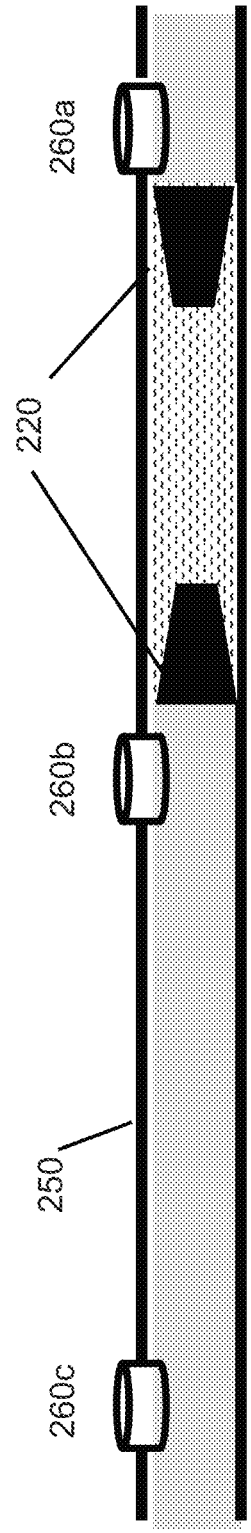
Figure 13C:
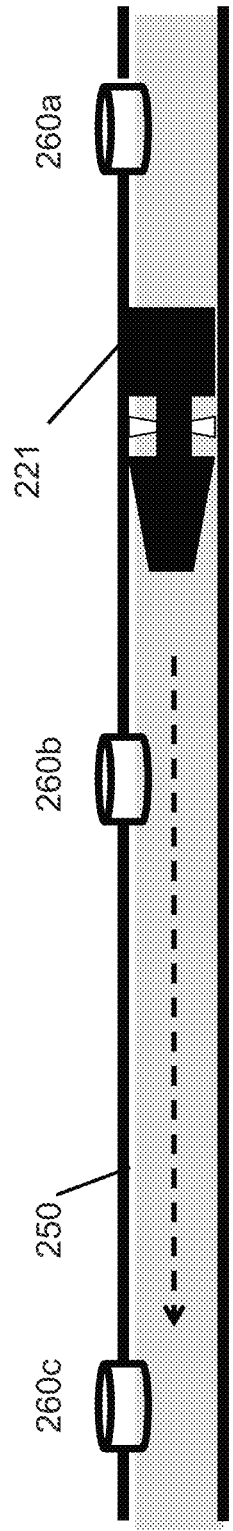

Step (4) noted above, pipeline cleaning and surface preparation, may be completed by autonomous robotic pigs or multiple pigs 220 operating in tandem powered by compressed air or water, as shown in FIG. 13B. In step (5), detailed mapping and surface assessment of the pipeline is performed by a measuring unit 221, a reconditioning plan is finalized, as shown in FIG. 13C.

Figure 13D:
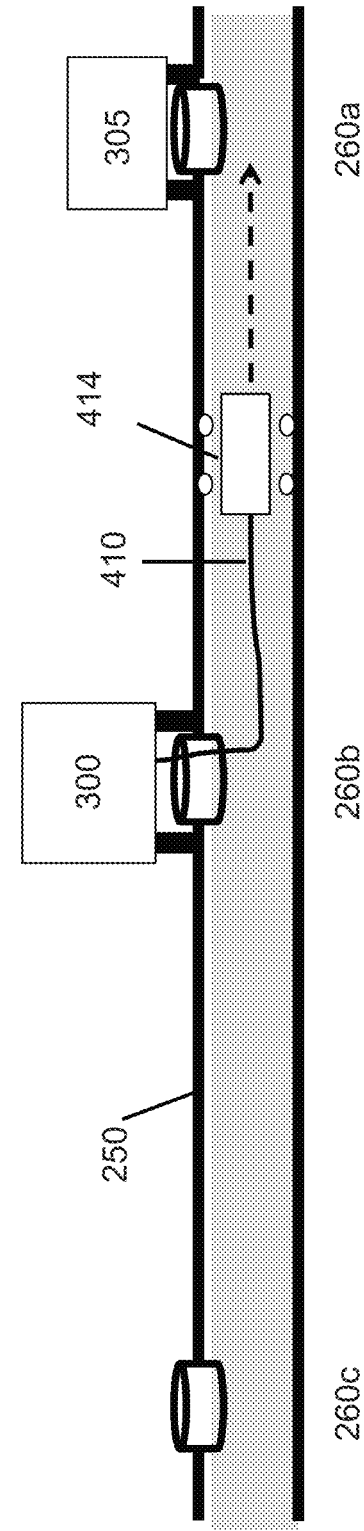
Figure 13G:
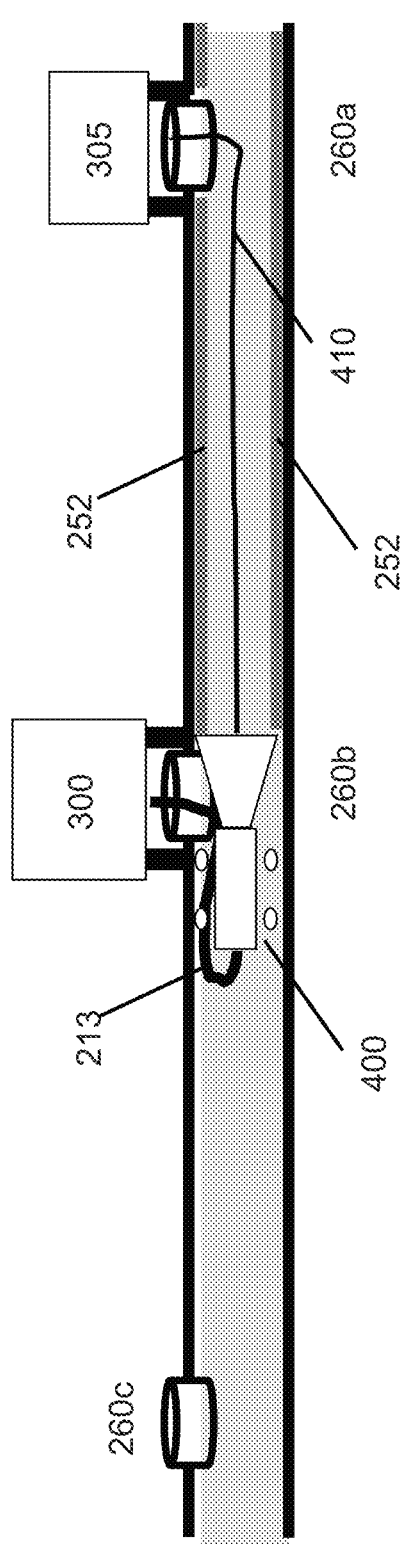
Figure 13H:
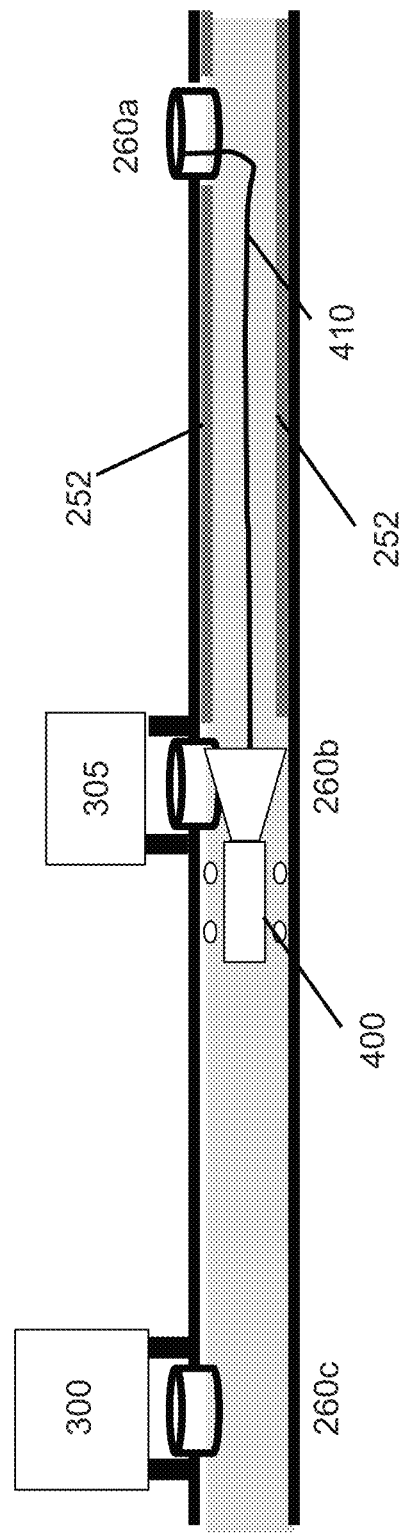
Figure 13K:
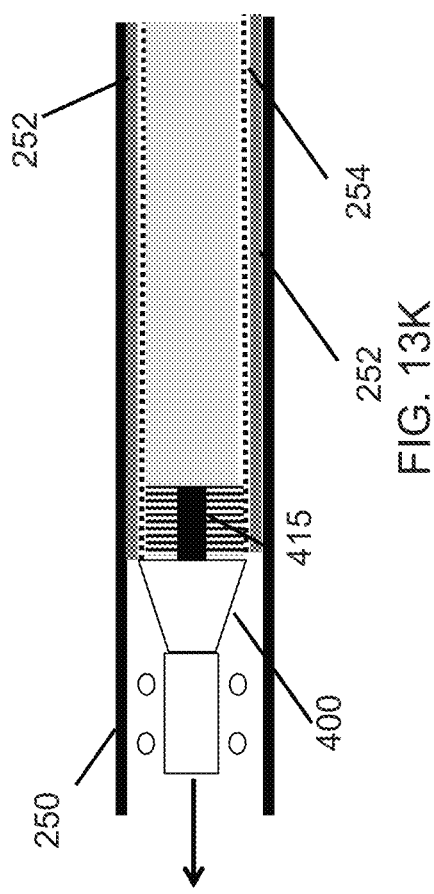

In step (6), a primary reconditioning pass is performed using a primary epoxy resin system based upon pipeline operating characteristics and requirements. As shown in FIG. 13D, a line towing unit 305 is positioned at the first access point 260a and a delivery system management unit 300 is positioned at the second access point 260b, and a cable towing unit 414 pulls a light towing line 410 from access point 260b to access point 260a. The line towing unit 305 then uses the light towing line 410 to pull a primary cable assembly 213 (including heavy tow cable 215, resin pipe 207, hardener pipe 210, control sensor line 209, and power cable 216) from access point 260b to access point 260a, as shown in FIG. 13E. The towed delivery system 400 is then positioned at access point 260a, and attached to the primary cable assembly 213, as shown in FIG. 13F. The delivery system management unit 300 then pulls the towed robotic delivery system 400 from access point 260a to access point 260b and epoxy layer 252 is deployed on pipeline 250 interior surface 251. The delivery system 400 also pulls towing line 410 from access point 260a to access point 260b (FIG. 13G). The delivery system management unit 300 is then moved to the third access point 260c and the line towing unit 305 to access point 260b, as shown in FIG. 13H. The first section of treated pipe 252 is then sealed and cured 253 using hot air, gas, steam or hot water, as shown in FIGS. 13I and 13J.

Figure 13L:
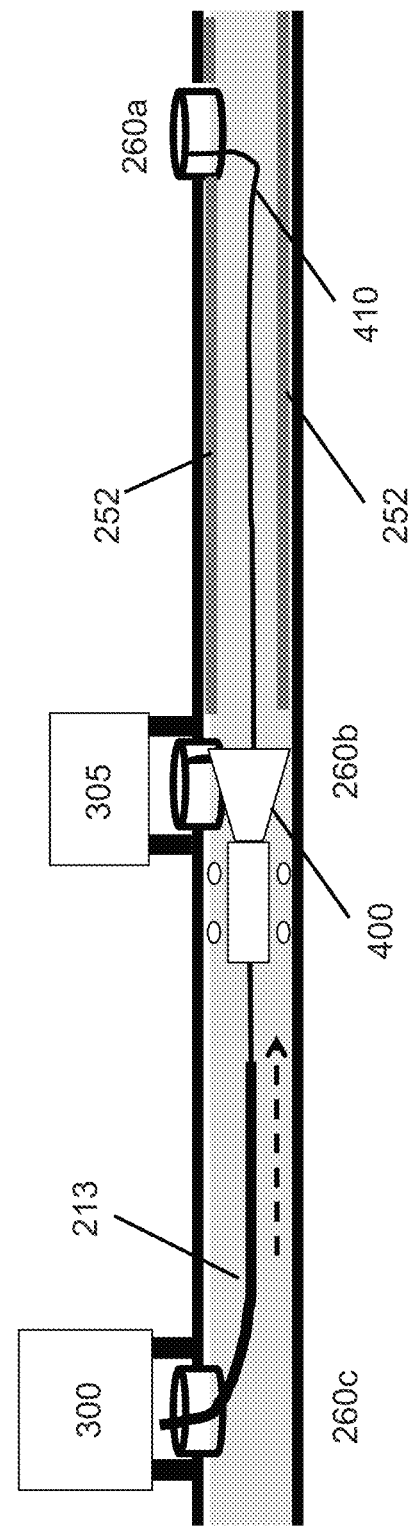

The process illustrated in FIG. 13D is then repeated from access point 260c to access point 260b, whereby by a self-powered robot 414 brings a towline 410 from access point 260c to access point 260b, shown in FIGS. 13I and 13J. In one embodiment of the process, shown in FIG. 13K, and as part of the process shown in FIG. 13H, the towed robotic delivery system 400 may tow a UV emission system 415. In this case, the epoxy 402 will include a photo initiator, which, upon exposure to the UV radiation will cure the inner layer (furthest from outside pipe wall). Depth of penetration of UV radiation in an opaque medium is limited, however, the thin layer 254 that is cured will serve to hold the epoxy layer 252 securely in place (even though the epoxy 402 is designed and formulated to be thixotropic) prior to a complete thermosetting cure being affected. The first section of pipe is now cured, and the process shown in FIG. 13E is then repeated and primary cable assembly 213 is delivered to the towed robotic delivery system 400 at access point 260b, as shown in FIG. 13L. The next section of pipe can now be reconditioned, using the same process steps discussed above.

Figure 14:
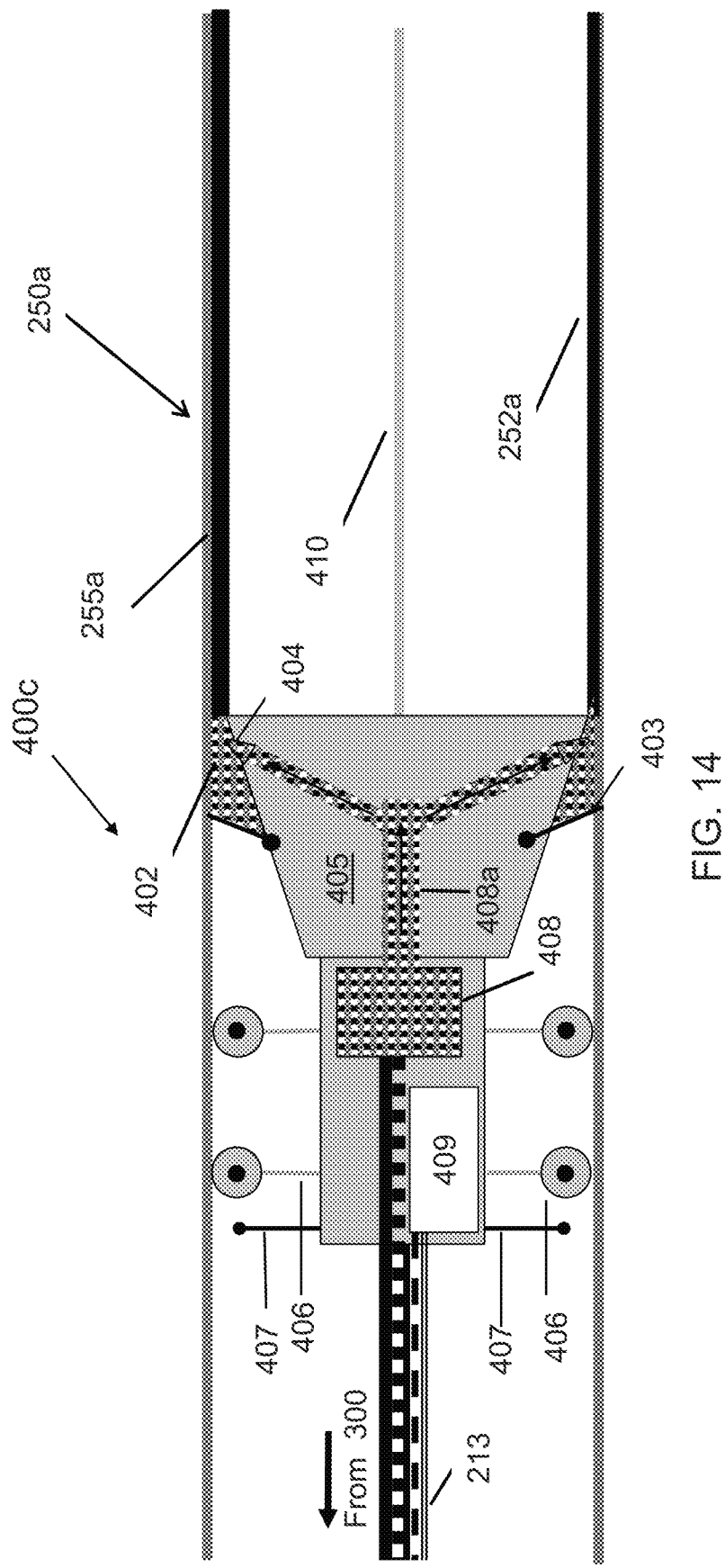
FIG. 14 shows an example process of making an extruded chopped filament pipe using a towed robotic delivery system of a pipeline reconditioning system in accordance with a further embodiment of the present application.

FIG. 14 shows an example of extruded chopped filament pipe (ECFP) 250a produced in the field with a delivery system 400c. ECFP 250a uses a thermoplastic outer pipe shell 255a. New composite pipe 250a can be built in the field with all the reconditioned pipe benefits and eliminate connectors. The outer shell pipe 255a acts as guide or pipe form and may be disposable or may be designed to augment pressure and gas containment capabilities. The outer pipe 255a can be a cost-effective thermoplastic pipe, such as made from PVC. The ECFP 250a eliminates cathodic and UV protection requirements. The contents of the epoxy 402 can be adjusted to provide heat insulation for the hot water pipes. Molded pipe 250a may have multiple layers contributing individual and collective properties. An epoxy pipe layer 252a can have any wall thickness required. Connectors for the track pipe 255a are simple and easy to install. The system can also be used to manufacture molded pipe in a factory. Internal epoxy layers 252a can be joined and sealed in the field at installations using a complementary epoxy gasket and adhesive. The process coats the pipe 250a with a durable, corrosion resistant epoxy resin layer 252a, effectively creating a new pipe.

Figure 15:
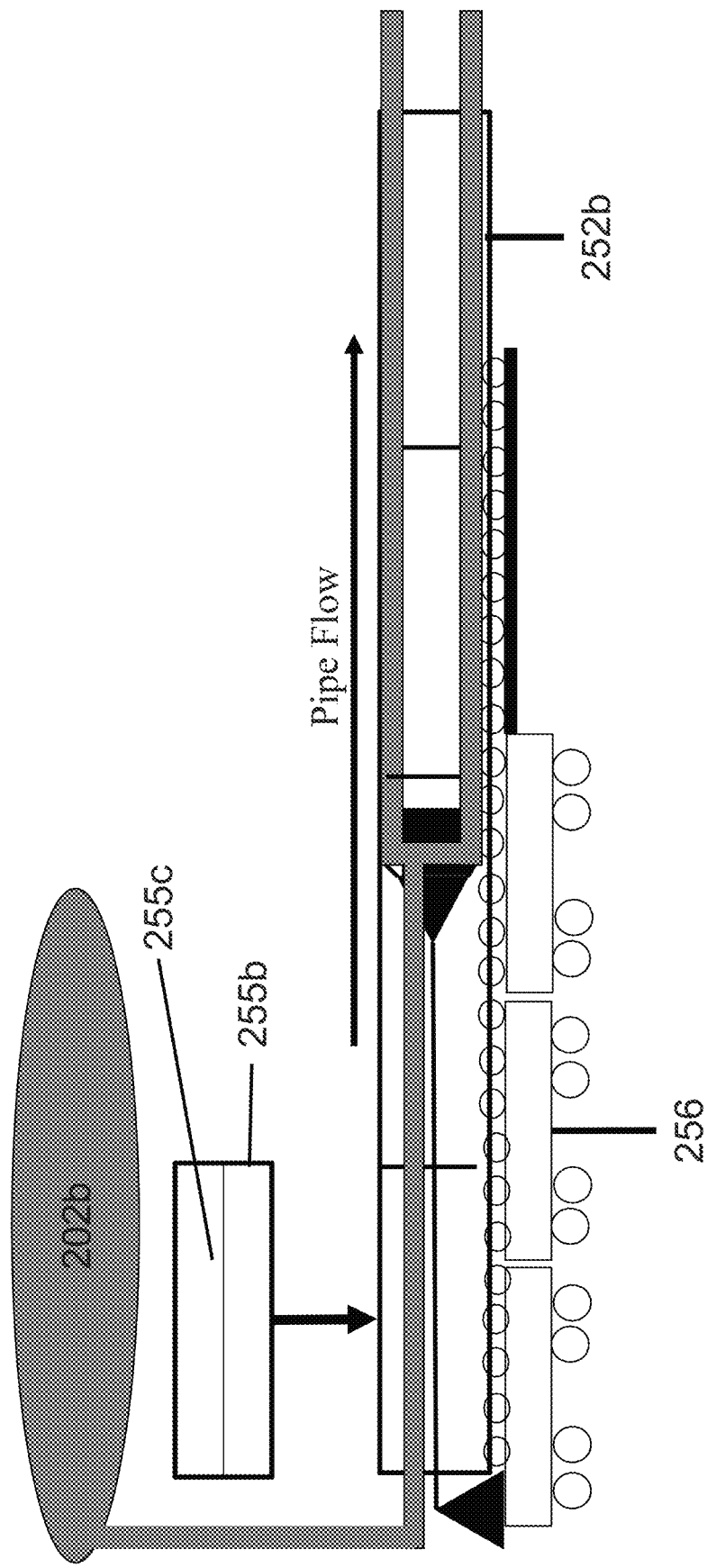
FIG. 15 shows an example of a continuous extruded chopped filament pipe manufacturing process in accordance with a further embodiment of the present application.

FIG. 15 shows an example of a continuous ECFP manufacturing process having a stationary robot system with extruder form. A reservoir 202b for the chopped fiber and epoxy is provided, which spools or weaves a seamless, ECFP 252b. The spooling or weaving may be done on or adjacent to a barge 256 for off-shore pipe or a truck bed 256 for on-shore pipe. A thermoplastic outer pipe 255b is provided, with a slit 255c along its length, which can be arranged over and around the ECFP 252b. The slit 255c can then be sealed to close the outer pipe 255b.

Because the ECFP as well as the pipe reconditioning system use a form to apply the epoxy system to the wall of the pipe, in another aspect of the invention, the shape of the form can be altered to suit specific purposes. The circular shape of the pipe can be retained using a circular form where the internal diameter of the pipe ($D_1$) minus the diameter of the form ($D_2$) divided by 2 will give the consistent thickness of the epoxy system (w) where ($D_1-D_2$)/2=w. Where, for example there are high levels of corrosion in the side walls of the target pipe and where the pipe is subsurface and subject to compression, increasing the thickness of the epoxy system on the side walls of the pipe may be optimal. Euler's critical load, which is the maximum load which a column (or pipe wall) can bear is defined by:

$$P_{cr} = \frac{\pi^2 EI}{(KL)^2}$$

wherein:
$P_{cr}$=Euler's critical load (longitudinal compression load on column),
E=modulus of elasticity of column material,
I=minimum area moment of inertia of the cross section of the column,
L=unsupported length of column, and
K=column effective length factor.

The critical load capacity ($P_{cr}$) may be increased by increasing the cross section of the wall (I). The maximum points of tension on the pipe wall under combined loading are at (a) and (b) of the pipe 250b shown in FIG. 16, Where: δ=deflection in pipe diameter due to compression stress; P=internal pressure of pipe; D=original diameter of pipe; C=compression stress. Therefore, in order to offset the tension at points (a) and (b) and increase $P_{cr}$, the pipe shape can be modified from a circular shape 257a (FIG. 17) to oval shape 257b (FIG. 18).

The pipe reconditioning system can be used for a wide variety of existing pipe installations, including carbon steel, galvanized steel, cast iron, concrete, thermoplastic (i.e., PP, PVC etc.) (may be used to add pressure capability or thermal insulation), Hybrids (including metallic/non-metallic combinations) and composite. The system may be also used in combination with any of the above materials to make new pipe, either in the factory or on-site to create pipe which has the performance capability which either meets or exceeds that of reconditioned pipe. The systems of the present application may be used with the pipes described in International Patent Application Nos. PCT/US2016/052822 (filed Sep. 21, 2016), PCT/US2016/019068 (filed Feb. 23, 2016) and PCT/US2016/019077 (filed Feb. 23, 2016), which are each incorporated by reference in their entireties.

The pipe reconditioning system can also be used for vertical pipe applications. In buildings there are corroded pipes that exist in both a vertical and horizontal orientation. The horizontal operating sequence can be modified for the vertical pipes. The epoxy can be adjusted to provide internal heat insulation for the hot water pipes.

It should be understood that, unless stated otherwise herein, any of the features, characteristics, alternatives or modifications described regarding a particular embodiment herein may also be applied, used, or incorporated with any other embodiment described herein. Also, the drawing herein is not drawn to scale. Although the invention has been described and illustrated with respect to exemplary embodiments thereof, the foregoing and various other additions and omissions may be made therein and thereto without departing from the spirit and scope of the present invention.

What is claimed:

1. A pipeline reconditioning system comprising:
a pipeline delivery system comprising a control unit and a towable deployment sled configured to deliver and dispense a layer of a reconditioning material to an inner surface of a pipeline;
a topside unit comprising one or more material reservoirs and a plurality of spools of pipe for delivering materials from the one or more material reservoirs to the pipeline delivery system; and
a delivery system management unit configured to be securely anchored in the pipeline at a first pipeline access point and to communicate with the control unit of the pipeline delivery system.

2. The pipeline reconditioning system according to claim 1, wherein the one or more material reservoirs comprise:
a reservoir of an epoxy resin;
a source of glass or basalt chopped fibers; and
a reservoir of a hardening material.

3. The pipeline reconditioning system according to claim 2, wherein the one or more material reservoirs further comprise a reservoir of a cleaning solvent configured to clean the pipeline prior to dispensing the reconditioning material.

4. The pipeline reconditioning system according to claim 1, wherein the topside unit is a mobile topside unit configured to be movable by a vehicle.

5. The pipeline reconditioning system according to claim 1, wherein the topside unit further comprises a storage unit configured to store the pipeline delivery system.

6. The pipeline reconditioning system according to claim 1, wherein the towable deployment sled comprises a plurality of wheels and is secured to a towing cable in communication with the delivery system management unit, which is configured to tow the deployment sled towards the delivery system management unit while dispensing the reconditioning material.

7. The pipeline reconditioning system according to claim 2, wherein the pipeline delivery system receives a primary cable assembly from the topside unit and the delivery system management unit, the primary cable assembly comprising:
a first pipe configured to carry the epoxy resin from the reservoir of the epoxy resin;
a second pipe configured to carry the hardening material from the reservoir of the hardening material;
a towing cable;

a control cable configured to connect to the control unit of the pipeline delivery system; and a power cable configured to connect to the control unit of the pipeline delivery system and supply electric power to the pipeline delivery system from a power supply.

8. The pipeline reconditioning system according to claim 7, wherein the primary cable assembly further comprises a supply line carrying the glass or basalt chopped fibers from the source of the glass or basalt chopped fibers.

9. The pipeline reconditioning system according to claim 8, wherein the pipeline delivery system further comprises a mixing unit configured to mix together two or more of the epoxy resin, the glass or basalt chopped fibers, and the hardening material to create the reconditioning material to be applied to the inner surface of a pipeline.

10. The pipeline reconditioning system according to claim 9, wherein the towable deployment sled comprises:
the mixing unit;
one or more distribution passages configured to receive the reconditioning material from the mixing unit; and
one or more pressurized distributors at ends of the one or more distribution passages configured to dispense and apply the layer of the reconditioning material to the inner surface of the pipeline.

11. The pipeline reconditioning system according to claim 10, wherein the one or more pressurized distributors comprise a hinge mechanism comprising a plurality of spring-loaded panels connected to a body of the deployment sled and having curved tips, wherein the hinge mechanism is positioned in front of an opening dispensing the reconditioning material in a direction of travel of the deployment sled and is configured to block leakage of the reconditioning material in front of the opening.

12. The pipeline reconditioning system according to claim 11, wherein the one or more pressurized distributors further comprise:
one or more nozzles configured to dispense the reconditioning material; and
a guide blade configured to apply the reconditioning material to the inner surface of the pipeline at a predetermined and consistent layer thickness.

13. The pipeline reconditioning system according to claim 11, wherein the one or more pressurized distributors further comprise an extruder configured to dispense the reconditioning material at a predetermined and consistent layer thickness.

14. The pipeline reconditioning system according to claim 11, wherein the one or more pressurized distributors further comprise:
one or more nozzles configured to rotate circumferentially and dispense the layer of the reconditioning material to the inner surface of the pipeline.

15. The pipeline reconditioning system according to claim 11, wherein the one or more pressurized distributors further comprise:
a plurality of nozzles arranged around a static disk configured to dispense the layer of the reconditioning material to the inner surface of the pipeline.

16. The pipeline reconditioning system according to claim 1, wherein the pipeline delivery system further comprises a curing device configured to cure the layer of reconditioning material applied to the inner surface of the pipeline with ultraviolet or microwave radiation.

17. The pipeline reconditioning system according to claim 7, wherein the delivery system management unit further comprises one or more sleds configured to be secured to the towing cable and provide the towing cable to the pipeline delivery system in the pipeline.

18. The pipeline reconditioning system according to claim 7, further comprising a line towing unit arranged at a second pipeline access point, the line towing unit configured to supply a towing line into the pipeline configured to be transported to the first pipeline access point through the pipeline and to pull the primary cable assembly from the first pipeline access point to the second pipeline access point via the towing line, wherein the pipeline delivery system receives the primary cable assembly at the second pipeline access point and travels towards the first pipeline access point while dispensing the reconditioning material to the inner surface of the pipeline.

19. A pipeline reconditioning method comprising:
arranging within a pipeline, a pipeline delivery system comprising a control unit and a towable deployment sled configured to dispense a layer of a reconditioning material to an inner surface of the pipeline;
providing one or more materials to the pipeline delivery system from one or more material reservoirs disposed in a topside unit comprising the one or more material reservoirs and a plurality of spools of pipe for delivering the one or materials from the one or more material reservoirs to the pipeline delivery system; and
towing, by a delivery system management unit, the towable deployment sled through the pipeline while the towable deployment sled is dispensing the reconditioning material to the inner surface of the pipeline, the delivery system management unit comprising configured to be securely anchored in the pipeline at a first pipeline access point and to communicate with the control unit of the pipeline delivery system.

20. The pipeline reconditioning method according to claim 19, wherein the one or more materials provided to the pipeline delivery system comprise one or more of an epoxy resin, glass or basalt chopped fibers, and a hardening material, and wherein the method further comprises:
mixing together the one or more materials provided to the pipeline delivery system by a mixing unit of the pipeline delivery system to create the reconditioning material to be applied to the inner surface of a pipeline;
dispensing and applying the layer of the reconditioning material to the inner surface of the pipeline by one or more pressurized distributors arranged on the deployment sled; and
curing the layer of the reconditioning material applied to the inner surface of the pipeline with ultraviolet or microwave radiation.

\* \* \* \* \*